(12) United States Patent
Bikumandla et al.

(10) Patent No.: US 10,805,594 B2
(45) Date of Patent: Oct. 13, 2020

(54) SYSTEMS AND METHODS FOR ENHANCED DEPTH SENSOR DEVICES

(71) Applicant: Facebook Technologies, LLC, Menlo Park, CA (US)

(72) Inventors: Manoj Bikumandla, Union City, CA (US); Andrew Matthew Bardagjy, Fremont, CA (US); Cina Hazegh, Walnut Creek, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 125 days.

(21) Appl. No.: 15/892,150

(22) Filed: Feb. 8, 2018

(65) Prior Publication Data
US 2019/0246091 A1    Aug. 8, 2019

(51) Int. Cl.
*H04N 13/218* (2018.01)
*G06T 7/536* (2017.01)
(Continued)

(52) U.S. Cl.
CPC ......... *H04N 13/218* (2018.05); *G02B 27/017* (2013.01); *G02B 27/4205* (2013.01); *G06T 7/536* (2017.01); *H04N 5/2254* (2013.01); *H04N 5/2259* (2013.01); *H04N 13/254* (2018.05); *H04N 13/271* (2018.05); *G02B 2027/014* (2013.01); *G02B 2027/0127* (2013.01); *G02B 2027/0147* (2013.01); *H04N 2213/001* (2013.01)

(58) Field of Classification Search
CPC .. H04N 13/218; H04N 13/254; H04N 13/271; H04N 5/2254; H04N 5/2259; H04N 2213/001; G02B 27/017; G02B 27/4205; G02B 2027/014; G02B 2027/0147; G02B 2027/0127; G06T 7/536
See application file for complete search history.

(56) References Cited

U.S. PATENT DOCUMENTS 5,227,915 A    7/1993   Grossinger et al.
5,742,433 A    4/1998   Shiono et al.
(Continued)

OTHER PUBLICATIONS

Li, Larry, "Time-of-Flight Camera—An Introduction", Texas Instruments,Technical White Paper, May 2014, 10 pages.
(Continued)

*Primary Examiner* — Joseph Suh
(74) *Attorney, Agent, or Firm* — FisherBroyles, LLP

(57) ABSTRACT

An exemplary depth imaging device includes an optical sensor having an optical axis, a lens positioned to focus light from a scene onto the optical sensor, a matrix of variable-phase optical elements that are dimensioned to introduce different phase delays into a wavefront of the light, and a housing that secures the matrix between the optical sensor and the lens. The device further includes a communication bus coupled to a processing subsystem that directs the optical sensor to capture at least two different perspectives of the scene to create an output image indicating depth within the scene. The device includes a positioning system that couples an optical component of the device to the housing. The optical component may include at least one of the lens, the optical sensor, or the matrix. Other related systems and methods are also provided.

20 Claims, 18 Drawing Sheets

(51) Int. Cl.
*H04N 5/225* (2006.01)
*G02B 27/42* (2006.01)
*H04N 13/254* (2018.01)
*H04N 13/271* (2018.01)
*G02B 27/01* (2006.01)

(56) References Cited

U.S. PATENT DOCUMENTS

| | | | |
|---|---|---|---|
| 6,327,086 | B1 | 12/2001 | Unno |
| 9,102,055 | B1* | 8/2015 | Konolige ................ B25J 9/163 |
| 2002/0135825 | A1 | 9/2002 | Lee et al. |
| 2003/0223618 | A1 | 12/2003 | Cahill et al. |
| 2007/0105445 | A1* | 5/2007 | Manto ................ H05K 7/1497 |
| | | | 439/620.09 |
| 2007/0132857 | A1 | 6/2007 | Grip et al. |
| 2007/0146531 | A1 | 6/2007 | Toshikiyo |
| 2008/0297752 | A1 | 12/2008 | Wang et al. |
| 2009/0127429 | A1* | 5/2009 | Kittelmann ......... A61F 9/00827 |
| | | | 250/201.2 |
| 2012/0105823 | A1 | 5/2012 | Hardegger et al. |
| 2012/0120030 | A1* | 5/2012 | McCarthy ............ G06F 3/0304 |
| | | | 345/175 |
| 2013/0002903 | A1* | 1/2013 | Manico .............. G06Q 50/2057 |
| | | | 348/231.6 |
| 2013/0075607 | A1 | 3/2013 | Bikumandla et al. |
| 2013/0088621 | A1 | 4/2013 | Hamada |
| 2013/0226344 | A1* | 8/2013 | Wong .................... G05D 1/024 |
| | | | 700/258 |
| 2014/0111620 | A1* | 4/2014 | Park .................. G02B 27/1006 |
| | | | 348/46 |
| 2014/0145281 | A1* | 5/2014 | Bever ............ H01L 31/035272 |
| | | | 257/431 |
| 2014/0153783 | A1* | 6/2014 | Tao ........................ G06T 7/557 |
| | | | 382/106 |
| 2015/0035946 | A1 | 2/2015 | Piestun et al. |
| 2016/0026253 | A1* | 1/2016 | Bradski ................ G02B 27/225 |
| | | | 345/8 |
| 2016/0148349 | A1* | 5/2016 | Cho ........................ G06T 5/005 |
| | | | 382/275 |
| 2016/0260205 | A1* | 9/2016 | Namboodiri ............... G06T 7/80 |
| 2016/0288330 | A1* | 10/2016 | Konolige ........... G06K 9/00201 |
| 2016/0309133 | A1* | 10/2016 | Laroia .................. H04N 5/2258 |
| 2016/0364015 | A1 | 12/2016 | Send ...................... G01S 17/32 |
| 2017/0059299 | A1* | 3/2017 | Safrani .................. G02B 27/10 |
| 2017/0220875 | A1* | 8/2017 | Jeromin ............. G06K 9/00791 |
| 2018/0063390 | A1 | 3/2018 | Trail |
| 2018/0096468 | A1* | 4/2018 | Nguyen ............... H04N 5/2258 |
| 2018/0124371 | A1* | 5/2018 | Kamal .................... H04N 5/247 |
| 2018/0217260 | A1 | 8/2018 | Price et al. |
| 2018/0218509 | A1 | 8/2018 | Price et al. |
| 2018/0247424 | A1 | 8/2018 | Bleyer et al. |
| 2018/0304824 | A1* | 10/2018 | Grimes ................... B60R 11/04 |
| 2019/0004535 | A1* | 1/2019 | Huang .................. G01S 17/023 |
| 2019/0037136 | A1* | 1/2019 | Downing ................ G01S 17/10 |
| 2019/0049232 | A1* | 2/2019 | Vakoc ..................... G01K 11/32 |
| 2019/0204599 | A1 | 7/2019 | Abbott |
| 2019/0208183 | A1* | 7/2019 | Schmidt ............... H04N 5/2256 |
| 2019/0356895 | A1* | 11/2019 | Varekamp ............ H04N 13/128 |

OTHER PUBLICATIONS

Mishchenko et al., "Spatial Filtering in Optical Image Processing," URL: https://laser.physics.sunysb.edu/lidiya/report/, Jun. 2004, pp. 1-12.

Mansurov, Nasim, "How Phase Detection Autofocus Works," URL: https://photographylife.com/how-phase-detection-autofocus-works, Jul. 2012, pp. 1-15.

* cited by examiner

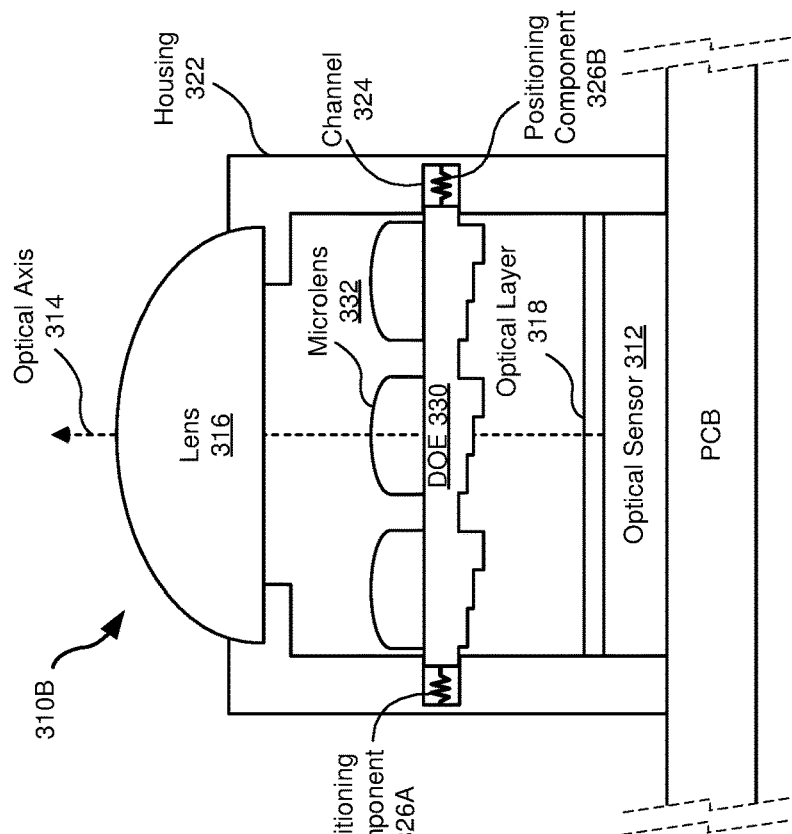
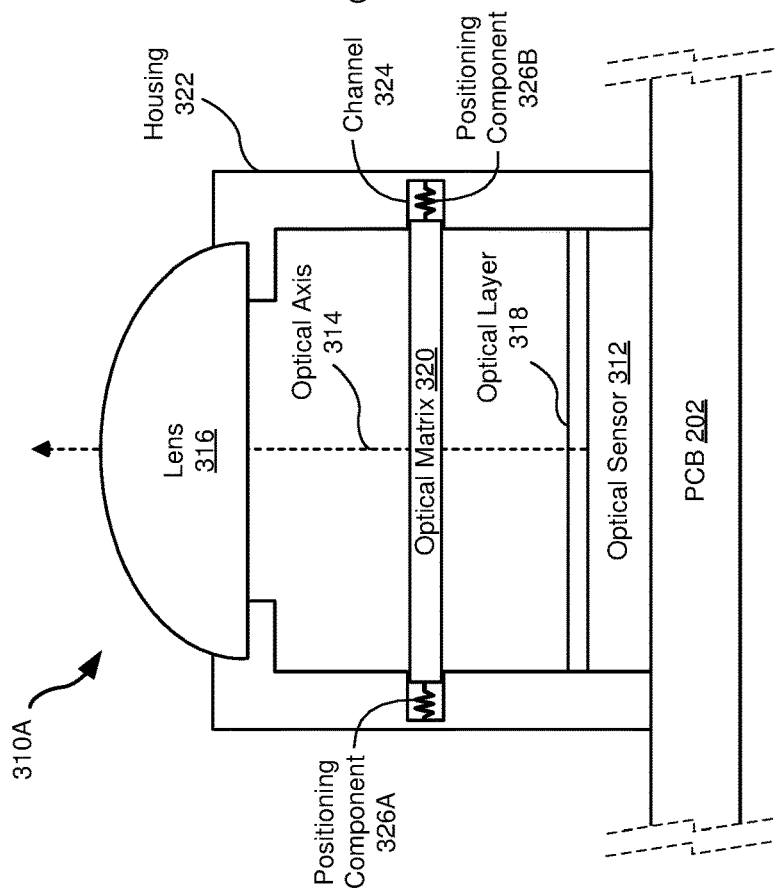
FIG. 3B
FIG. 3A

SYSTEMS AND METHODS FOR ENHANCED DEPTH SENSOR DEVICES

BACKGROUND

Imaging systems may use optical sensors in a wide variety of applications to capture images, video, and other information characterizing a scene or objects within the scene. However, conventional optical sensor devices and systems may have a variety of limitations. For example, a conventional image sensor that captures standard images from light in the visible spectrum may not be able to provide depth information for a scene. Conversely, conventional time-of-flight (ToF) sensors may have lower resolution than other image sensors due, at least in part, to the circuitry that may be required to demodulate a reflected signal to calculate depth within a scene. Additionally, some traditional hyperspectral imaging systems are designed to increase spectral resolution at the expense of spatial resolution. What is needed, therefore, are improved imaging devices, systems, and methods.

SUMMARY

As will be described in greater detail below, the instant disclosure describes systems, devices, and methods that allow for the capture and use of multiple perspectives of a scene to increase resolution of the depth sensing systems. For example, an optical image sensor may be enabled to generate images, such as depth maps, that have a resolution along the optical axis of the image sensor, i.e. a depth resolution. Disclosed systems, devices, and methods may provide for ordinary image capture cameras to be used in generating depth maps and may permit higher resolution depth maps to be obtained.

In one example, a depth imaging device may include an optical sensor having an optical axis, a lens positioned to focus light from a scene onto the optical sensor, a matrix of variable-phase optical elements that are dimensioned to introduce different phase delays into a wavefront of the light from the scene, and a housing that may secure the matrix between the optical sensor and the lens. The depth imaging device may further include a communication bus coupled to a processing subsystem that may direct the optical sensor to capture at least two different perspectives of the scene to create an output image indicating depth within the scene. The depth imaging device may further include a positioning system. The positioning system may couple an optical component of the depth imaging device to the housing. The optical component may include at least one of the lens, the optical sensor, or the matrix.

In some implementations, the positioning system may include at least one of a channel configured to receive an edge of the optical component, an adhesive securing the optical component in a fixed position relative to the housing, or a positioning component operable to moveably position the optical component at least substantially perpendicular to the optical axis. The processing subsystem may be configured to perform the portion of the phase differentiation process by capturing a first image when the optical component is in a first position, actuating the positioning component to move the optical component from the first position to a second position, capturing a second image when the optical component is in the second position, and combining the first image and the second image into an output image having depth information characterizing at least a portion of the scene. The processing subsystem may be further configured to combine the first image and the second image into the output image by triangulation between two different perspectives of the scene represented by the first image and the second image in order to provide a depth map of the scene as the output image. The depth map may include depth dimension values for a plurality of portions of the scene. The first and second images may include depth images of the scene, with each image having a three-dimensional representation of the scene. The output image may include depth information from the first image and the second image.

In some implementations, the processing subsystem may be programmed to capture a first image when the optical component is in a first position, actuate a positioning component to move the optical component from the first position to a second position, capture a second image when the optical component is in the second position, generate interpolated pixel data corresponding to image data between the first position and the second position, combine the first and second images with the interpolated pixel data in an output image that may have greater resolution than either the first image or the second image. The matrix of variable-phase optical elements may decrease or subdivide an instantaneous field-of-view (iFOV) of each pixel included in the optical sensor to provide higher angular resolution. The depth imaging device may further include a light source configured to illuminate the scene with light in an infrared wavelength range configured for use in depth sensing. The matrix of variable-phase optical elements comprises a diffractive optical element (DOE) having features that are dimensioned to introduce at least two different phase delays into a wavefront of the light in the infrared wavelength range received as reflected from the scene through the lens to at least partially optically demodulate the light. The depth imaging device may further include an array of microlenses disposed on a top surface of the matrix to focus light through the matrix. Each microlens of the array may be positioned consistently with respect to a pattern present in the matrix of variable-phase optical elements.

In another example, a depth imaging system may include an imaging device and a light projector. The imaging device may include an optical sensor having an optical axis, a lens positioned to focus reflected light from a scene onto the optical sensor, a matrix of variable-phase optical elements patterned to introduce at least two different phase delays into a wavefront of the light from the scene, and a housing. The housing may secure the matrix between the optical sensor and the lens in a configuration that enables the optical image sensor to capture different perspectives of the scene to create an output image. The light projector device may include a light source that emits light and a lens to direct the emitted light from the light source toward the scene, where the scene reflects the emitted light so as to produce the reflected light.

In some implementations, the depth imaging system may further include an optical layer over the optical sensor, with the optical layer passing infrared light in a first wavelength range. The light source may emit infrared light of the first wavelength range. The depth imaging system may further include a processing subsystem that may be programmed to cause the light source to emit a modulated light signal in the first wavelength range, to capture a first perspective of the at least two different perspectives as a first image, to capture a second perspective of the at least two different perspectives as a second image, and to combine the first image and the second image into an output image forming a three-dimensional image of the scene.

In another example, a method for geniting depth images may include positioning a matrix of variable-phase optical elements in a first position at least substantially perpendicular to an optical axis of the optical sensor, capturing at least two different perspectives of a scene, determining depth characteristics of the scene based on the captured at least two perspectives of the scene, and generating an output depth image of the scene. The output depth image may represent the depth characteristics of the scene. The matrix may be disposed between an optical sensor and a lens positioned to focus light from a scene onto the optical sensor. An optical sensor may be used in capturing the at least two perspectives of the scene.

In some implementations, the method may further include positioning the matrix of variable-phase optical elements in a second position at least substantially perpendicular to the optical axis such that the optical sensor is positioned to capture a second perspective of the at least two different perspectives. Capturing the at least two different perspectives of a scene may include capturing a first image when an optical component is in a first position associated with a first perspective and capturing a second image when the optical component is in a second position associated with a second perspective. The optical component may include at least one of the lens, the optical sensor, or the matrix of variable-phase optical elements. The first image and the second image may each include depth information, such that the first and second images may include three-dimensional representations of the scene. Alternatively, the first image and the second image do not each include depth information, such that the first and second images may include only two-dimensional representations of the scene. The method may further include emitting a light signal into the scene for reflection back from the scene to the lens, wherein determining depth characteristics of the scene based on the captured at least two perspectives of the scene may include determining phase characteristics of the light signal, the phase characteristics including a phase difference indicative of a distance between the optical sensor and portions of the scene. The matrix may direct a portion of light having a first phase delay to a first pixel of the optical sensor and may direct a portion of light having a second phase delay to a second pixel of the optical sensor.

In some examples, the above-described method may be encoded as computer-readable instructions on a computer-readable medium. For example, a computer-readable medium may include one or more computer-executable instructions that, when executed by at least one processor of a computing device, may cause the computing device to position a matrix of variable-phase optical elements in a first position at least substantially perpendicular to an optical axis of the optical sensor, capture at least two different perspectives of a scene, determine depth characteristics of the scene based on the captured at least two perspectives of the scene, and generate an output depth image of the scene. The different perspectives may be provided by moving or dithering the matrix of variable-phase optical elements.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate several exemplary embodiments and are a part of the specification. Together with the following description, these drawings demonstrate and explain various principles of the instant disclosure.

FIGS. 3A, 3B, 3C, and 3D are cross-sectional diagrams of exemplary imaging devices, according to some embodiments.

Figure 1:
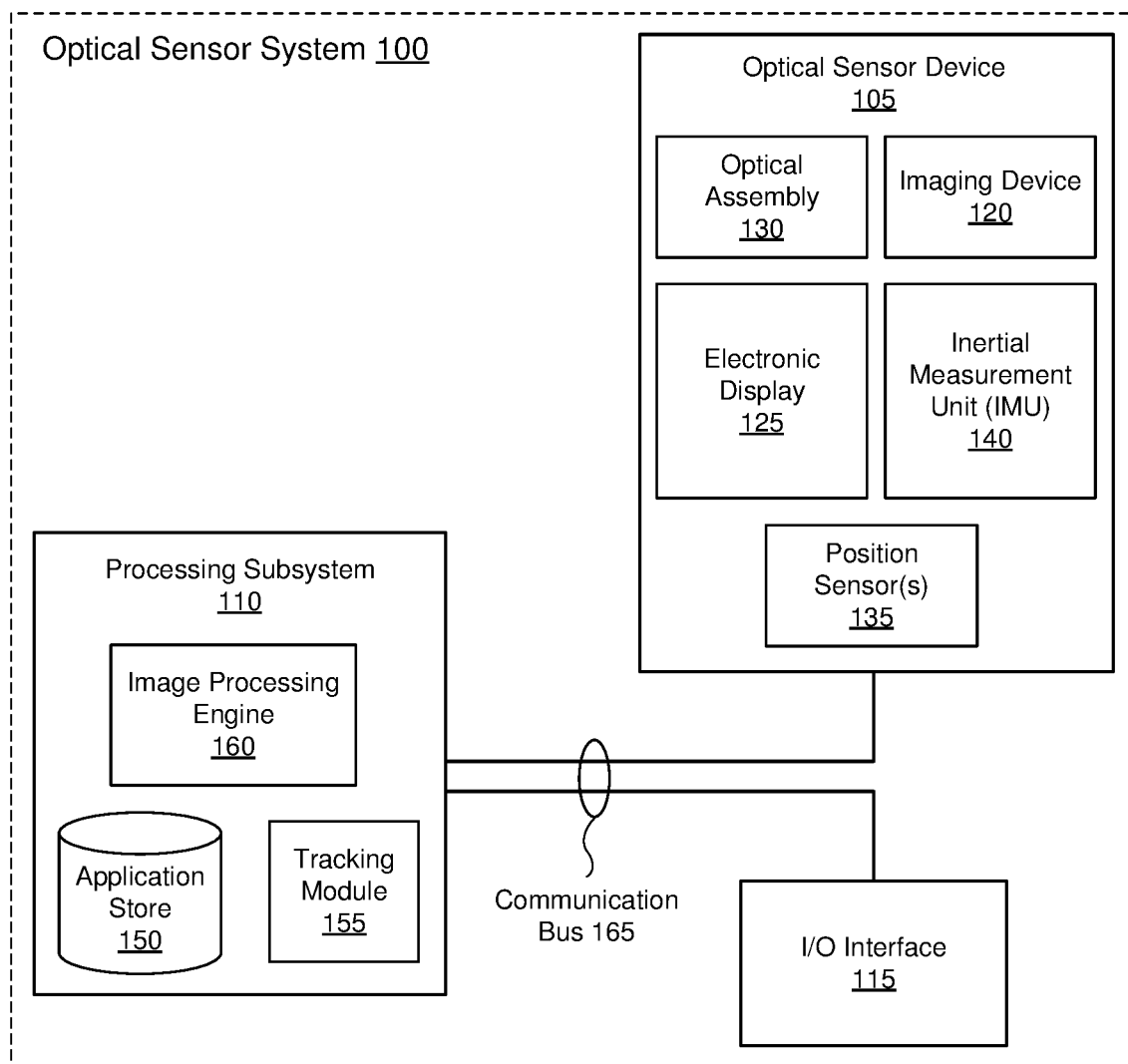
FIG. 1 is a block diagram of an optical sensor system including a processing subsystem, an optical sensor device, and an input/output (I/O) interface, according to some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems, devices, and methods that use a matrix of variable-phase optical elements (e.g., diffractive optical elements (DOES)) to introduce phase delays into a wavefront of light received through a lens, thereby enhancing the performance of optical sensors and devices that capture aspects of a scene. These enhancements may be a function of how light passes through the variable-phase optical elements and, in some embodiments, may also be a function of shifting the matrix or another optical component (e.g., a sensor or lens) of an optical device. For example, the phase delays introduced by the matrix of variable-phase optical elements may enable the optical sensor to capture at least two different perspectives of a scene, and the systems and devices presented herein may use the different perspectives to provide or increase resolution (e.g., in an angular, depth, and/or spectral dimension) of output images or frames of an optical device.

Devices disclosed herein may use variable-phase optical elements to capture different perspectives of a scene in a variety of different manners and for numerous different purposes. For example, a DOE may be configured to, while in an initial position, disperse light from a scene as an interference pattern on an optical sensor, which may capture the interference pattern as a first perspective of the scene. The DOE may be shifted laterally to a second position such that the resulting interference pattern represents another perspective of the scene, which may also be captured by the optical sensor. These two perspectives may be processed to increase angular resolution (e.g., via oversampling) or to provide depth sensing (e.g., via triangulation and/or phase discrimination). For example, depth values of a scene may be obtained using triangulation between two perspectives, by using a DOE to provide the two perspectives to a single optical sensor. As another example, each element within a layer or matrix of variable-phase optical elements may be configured to deterministically phase-shift and focus light onto particular pixels (or sets of pixels) of an optical sensor. These phase-shifted wavefronts, which may represent different perspectives of a scene, may be captured, mixed, and compared against a reference signal to detect depth within a scene.

Embodiments of the instant disclosure may also be implemented within various types of systems (e.g., traditional CMOS sensor systems, time-of-flight (ToF) systems, hyperspectral imaging systems, etc.) having diverse configurations (e.g., configurations with static or movable optical components). As an example of an implementation with movable optical components, an imaging device may include a matrix of variable-phase optical elements positioned over individual pixels of an image sensor and an actuator configured to move a component of the imaging device (e.g., the matrix, the sensor, a lens, etc.) to obtain two different images representing two different instantaneous fields of view (iFOVs) per pixel. The system may then analyze these images to obtain or deduce additional spatial information for the imaged scene. In some examples with a ToF sensor, a scene may be captured in greater spatial resolution by using a conventional large pixel ToF sensor system and translating the component to oversample the portion of the image plane or scene. In examples with a non-ToF sensor (e.g., a traditional CMOS sensor), the system may perform a triangulation operation and/or a phase-discrimination operation on the different iFOVs to calculate a depth map of the scene. The system may also, for both non-ToF and ToF sensors, interpolate between the phase-shifted iFOVs to improve angular resolution of images captured by the sensors.

The oversampling process may also be used to increase spatial resolution in various hyperspectral imaging systems (e.g., snapshot hyperspectral imaging systems). Traditional hyperspectral imaging may use hyperspectral filters (e.g., tiled filters, mosaic filters, etc.) disposed directly on a sensor to sample broadband light in the spectral domain, which may increase spectral resolution at the expense of spatial resolution. In contrast, the proposed hyperspectral imaging system may decouple the hyperspectral filters from the sensor and position the variable-phase optical elements between the filters and the sensor to facilitate spatial oversampling and improved spatial resolution. For example, a scene may be captured in a hyperspectral image in greater spatial resolution by translating the variable-phase optical elements to oversample portions of the image plane or scene through the individual windows of the hyperspectral filter.

In addition to being used to improve resolution through triangulation, phase discrimination, and oversampling, the optical elements disclosed herein may be configured to replace at least one electrical phase-shift component of a demodulation system. For example, an optical device may include variable-phase optical elements positioned over a sensor to introduce deterministic phase shifts into an incident wavefront. The system may then capture the phase-shifted images at a sensor and send them to a demodulation circuit that (1) uses the images to determine a phase shift of the incident wavefront relative to a transmitted carrier signal and (2) uses the phase shift to identify depth within a scene. In some examples, the system may provide relatively low phase resolution by comparing two phase-shifted signals or may provide higher phase resolution by comparing several (e.g., three or more) phase-shifted signals. A time of flight measurement can be performed using the phase-shifted signals in a ToF depth sensor. Additionally or alternatively, the system may include a single layer of variable-phase optical elements or stacked layers of variable-phase optical elements configured to introduce phase shifts that are traditionally handled by electrical components. Examples of such stacked or layered configurations are included in FIGS. 3C, 3D, and 6G, which are described below in greater detail.

In such a system, each optical component may be fixed in a single position and/or movable among two or more positions in a plane perpendicular to the optical axis. For example, a system with fixed optical components may introduce two or more different phase shifts in an incident wavefront. These phase-shifted signals may then be mixed and compared with a reference signal. As another example, a global shutter system may include optical elements that create two phase-shifted optical paths that are captured and stored by a sensor while the optical elements are in a first position. The system may then shift the optical elements to a second position to create two additional phase-shifted optical paths, which may also be captured by the sensor. As a result, the sensor may simultaneously provide four phase-shifted signals to an electrical quadrature demodulation component, where they may be mixed and compared to a reference signal to create a depth map of a scene. Embodiments of the instant disclosure may also provide various other configurations, features, and advantages over traditional optical sensor systems, as discussed in greater detail with reference to the FIGS. 1-11 below.

The following will provide, with reference to FIGS. 1-11, detailed descriptions of exemplary systems, devices, and methods for enhancing optical sensor devices. For example, the drawings and accompanying description demonstrate how embodiments of the present disclosure can overcome certain limitations of conventional optical sensors (both optical image sensors and optical depth sensors).

FIG. 1 is a block diagram of one embodiment of an optical sensor system 100. The optical sensor system 100 shown in FIG. 1 may include an optical sensor device 105 and an input/output (I/O) interface 115, both of which may be coupled to a processing subsystem 110. In some embodiments, the optical sensor device 105, the processing subsystem 110, and/or the I/O interface 115 may be integrated into a single housing or body. Other embodiments may include a distributed configuration of the optical sensor system 100, in which the optical sensor device 105 may be in a separate housing or enclosure, but still coupled to the processing subsystem 110 by a wired or wireless communication channel. For example, the optical sensor device 105 may be coupled to a processing subsystem 110 that is provided by an external gaming console or an external computer, such as a desktop or laptop computer, etc. The processing subsystem 110 may also be a specialized hardware component designed to cooperate specifically with the optical sensor system 105 to perform various operations described herein.

While FIG. 1 depicts an exemplary optical sensor system 100 that includes at least one optical sensor device 105 and at least one I/O interface 115, in other embodiments, any number of these components may be included in the optical sensor system 100. For example, there may be multiple optical sensor devices 105 communicating with the processing subsystem 110. In alternative configurations, different and/or additional components may be included in the optical sensor system 100. Additionally, functionality described in conjunction with one or more of the components shown in FIG. 1 may be distributed among the components in a different manner than described in conjunction with FIG. 1. For example, some or all of the functionality of the processing subsystem 110 may be provided by components included in the optical sensor device 105, such as a system-on-a-chip (SOC) implementation of the optical sensor device 105 that includes an integrated image processor.

Some embodiments of the optical sensor device 105 may include an imaging device 120, an electronic display 125, an optical assembly 130 (also referred to as an optics block 130), one or more position sensors 135, and an inertial measurement unit (IMU) 140. Some embodiments of the optical sensor device 105 may have different components than those described in conjunction with FIG. 1.

The imaging device 120 may capture data characterizing a scene or local area surrounding some or all of the optical sensor device 105. In some embodiments, the imaging device 120 may include a traditional image sensor, such that the signals captured by the imaging device 120 include only two-dimensional image data (e.g., data having no depth information). In some embodiments, the imaging device 120 may operate as a depth imaging system that computes depth information for a scene using collected data (e.g., based on captured light according to one or more computer-vision schemes or algorithms, by processing a portion of a structured light pattern, by time-of-flight (ToF) imaging, by simultaneous localization and mapping (SLAM), etc.), or the imaging device 120 may transmit corresponding data to another device, such as the processing subsystem 110, which may determine or generate the depth information using the data from the imaging device 120. To enable or augment such computer-vision schemes, the imaging device 120 may include a projector device, in some embodiments.

In some embodiments, the imaging device 120 may be a hyperspectral imaging device that can represent a scene as multiple spectra of light such that different features or objects within the scene, which may be best visualized utilizing light of specific wavelengths, may be better understood, analyzed, and/or visually or quantitatively described.

In embodiments including the electronic display 125, the electronic display 125 may display two-dimensional or three-dimensional images to the user in accordance with data received from the processing subsystem 110. In embodiments including the electronic display 125, the optical assembly 130 may magnify image light received from the electronic display 125, correct optical errors associated with the image light, and/or present the corrected image light to a user of the optical sensor device 105.

The I/O interface 115 in FIG. 1 may represent a device that allows a user to send action requests and receive responses from the processing subsystem 110. In some embodiments, an external controller may send such action requests and receive such responses via the I/O interface 115. An action request may, in some examples, represent a request to perform a particular action. For example, an action request may be an instruction to start or end capture of image or video data or an instruction to perform a particular action within an application. The I/O interface 115 may include one or more input devices. Exemplary input devices include a keyboard, a mouse, a hand-held controller, or any other suitable device for receiving action requests and communicating the action requests to the processing subsystem 110.

The processing subsystem 110 may receive data from the optical sensor device 105 for processing to extract information or to combine data sets. In some embodiments, the processing subsystem 110 may provide content to the optical sensor device 105 for processing in accordance with information received from one or more of the imaging device 120, the optical sensor device 105, and the I/O interface 115. In the example shown in FIG. 1, the processing subsystem 110 includes an image processing engine 160, an application store 150, and a tracking module 155. Some embodiments of the processing subsystem 110 may have different modules or components than those described in conjunction with FIG. 1. Similarly, the functions further described below may be distributed among components of the processing subsystem 110 in a different manner than described in conjunction with FIG. 1.

The application store 150 may store one or more applications or instruction sets for execution by the processing subsystem 110 or by the optical sensor device 105. An application may, in some examples, represent a group of instructions that, when executed by a processor, generates content for presentation to the user. Content generated by an application may be generated in response to inputs received from the user via movement of the optical sensor device 105 or the I/O interface 115. Examples of applications include gaming applications, conferencing applications, video playback applications, or other suitable applications. The application store 150 may be a non-transitory memory store that also stores data obtained from the imaging device 120 or from other sources included in the optical sensor device 105 or received from the processing subsystem 110. Some exemplary applications in the application store 150 may include instructions for performing the methods described herein.

The tracking module 155 may calibrate the optical sensor system 100 using one or more calibration parameters and may adjust the calibration parameters to reduce error in determination of the position of the optical sensor device 105 or of the I/O interface 115. Additionally, the tracking module 155 may track movements of the optical sensor device 105 or of the I/O interface 115 using information from the imaging device 120, the one or more position sensors 135, the IMU 140, or some combination thereof.

The engine 160 may generate a three-dimensional depth mapping or multiple three-dimensional depth mappings of the area (e.g., the "scene" or the "local area") surrounding some or all of the optical sensor device 105 based on information received from the optical sensor device 105 or from components thereof, such as the imaging device 120. In some embodiments, the engine 160 may generate depth information for the three-dimensional mapping of the scene based on two-dimensional information or three-dimensional information received from the imaging device 120 that is relevant for techniques used in computing depth maps. The depth maps may include depth dimension values for each of the pixels in the depth map, which may represent multiple different portions of a scene. The engine 160 may calculate depth information using one or more techniques in computing depth from structured light or unstructured light. In various embodiments, the engine 160 may use the depth information to, for example, generate or update a model of the local area, and may generate content based in part on the model. For example, the engine 160 may identify a first delay component or phase difference $\phi 1$ based on an emitted signal and a received signal in a ToF depth sensor system. The phase difference $\phi 1$ may be determined by the engine 160 by subtracting a known or deterministic second delay component $\phi 2$ from a measured phase difference $\phi$, as is described herein in further detail.

Additionally, the optical sensor system 100 may include a communication bus 165 that may transmit information between individual components of the optical sensor device 105, the processing subsystem 110, and/or the I/O interface 115 to permit the individual components to cooperate according to embodiments described herein. The I/O interface 115 may permit the optical sensor system 100 to interact, via a wired or wireless channel, with external devices and/or system accessories, such as additional stand-alone-sensor systems, hand-held controllers, etc.

Figure 2:
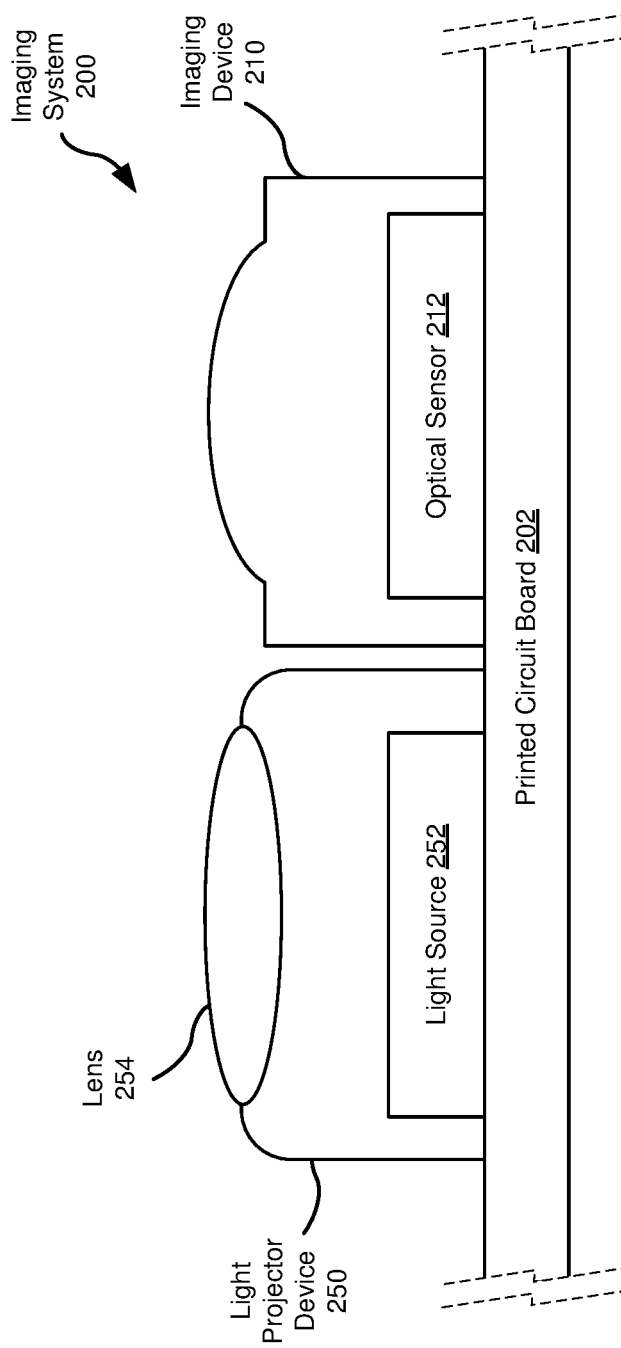
FIG. 2 is a cross-sectional diagram of the imaging device of FIG. 1, according to some embodiments.

FIG. 2 is a cross-sectional diagram of an imaging device 120 of the optical sensor device 105 of FIG. 1, referred to as an imaging system 200, according to some embodiments. As seen in FIG. 2, the imaging system 200 includes an imaging device 210 having an optical sensor 212 that may receive electromagnetic signals in and/or around the visible wavelength range, including or excluding infrared wavelength ranges, and convert those electromagnetic signals into electronic signals that may be subsequently processed to extract information about the imaging environment in front of the imaging device 210. The imaging system 200 may further include a light projector device 250, which may include a light source 252 producing light in a desired spectrum and at least one lens 254 to control the spread and direction of light from the light source 252. The projector device 250 may be configured with mirrors, filters, lenses, and other optical components that may be used to shape, direct, and/or filter light being emitted or projected into the local environment or scene by the light source 252. The light source 252 may be configured to emit structured or unstructured light and may be configured to provide steady light or light modulated by pulse or continuous wave functions. As shown in FIG. 2, the imaging device 210 and the light projector device 250 may be coupled together by a printed circuit board (PCB) 202. In some embodiments, the emitted light may be used as a reference signal to be compared with a reflected light signal. The PCB 202 may include a plurality of leads that couple both the imaging device 210 and the light projector device 250 to a power source and/or an external processing device or system, such as the processing subsystem 110 of FIG. 1.

As described herein, the imaging device 210 may be used to permit a conventional image capture system to provide depth information in addition to two-dimensional image information, to oversample light reflected from a scene to increase resolution of depth images, to enable optical demodulation to detect phase differences in reflected and reference light signals, and/or to increase resolution of hyperspectral images beyond the limits imposed by hyperspectral filtering.

Figures 3C, 3D:
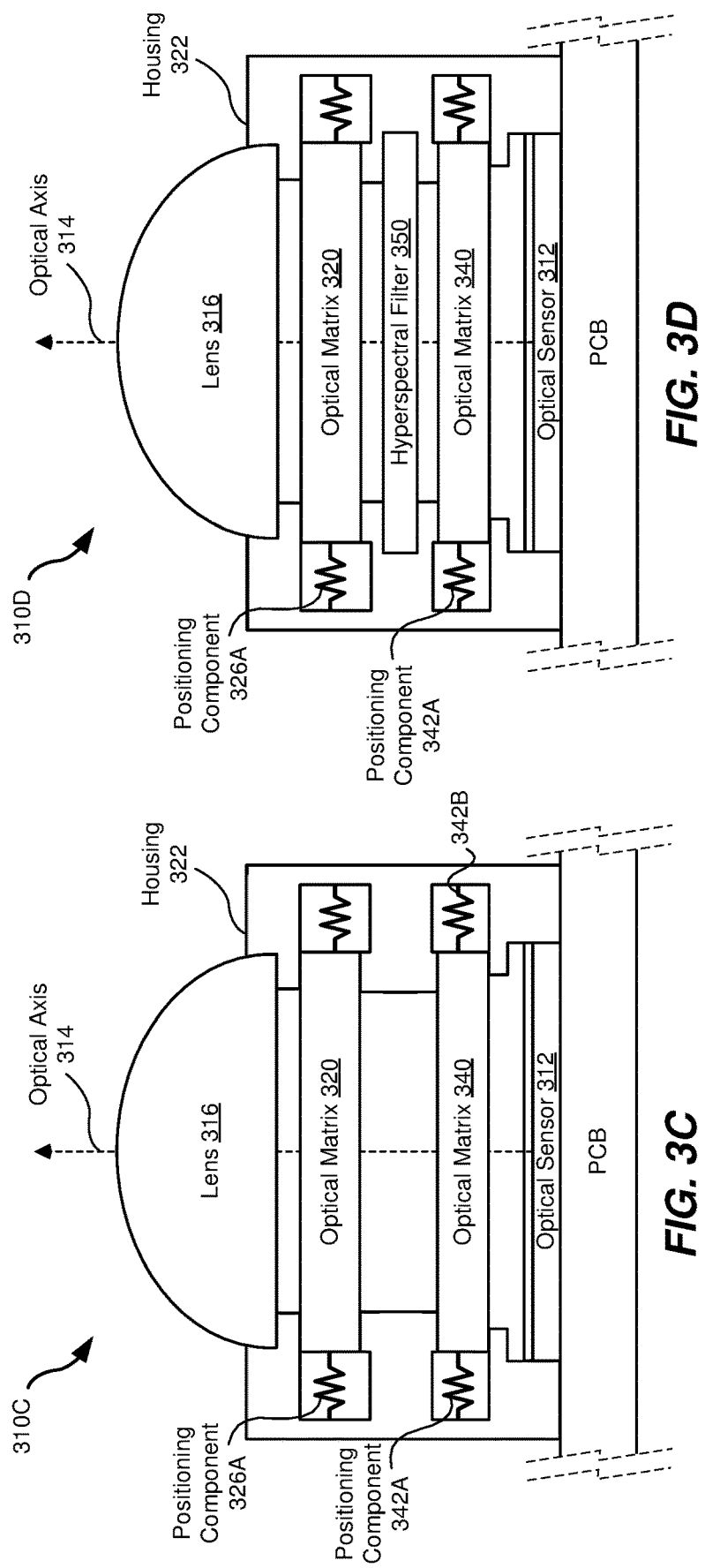

FIGS. 3A, 3B, 3C, and 3D are cross-sectional diagrams of exemplary imaging devices, according to some embodiments. As shown in FIG. 3A, an imaging device 310A may include an optical sensor 312, which may be aligned along an optical axis 314 with a lens 316. The optical sensor 312 may be a conventional CMOS image sensor configured to capture information for presentation as a two-dimensional image or image file, without any depth information. Other optical sensors may be used in other embodiments, including optical sensors that are designed to capture three-dimensional images. The optical sensor 312 may include a two-dimensional array of individual photosensitive or photoreactive regions or areas, referred to as photodetectors or pixels. The pixels may be provided by photodiodes (such as single photon avalanche diodes (SPADs)), photoresistors, or other suitable photodetectors. The optical sensor 312 may further include control circuitry used to read from and reset the pixels of the array and may further include image processing circuitry. Image processing circuitry included in the optical sensor 312 may include circuitry to perform autofocus operations, color correction and white-balance operations, compression and formatting operations, and/or other operations and processes as described herein.

In some embodiments, the optical sensor 312 may be configured to capture light primarily in the visible wavelength range. For example, the optical sensor 312 may include an optical layer 318 disposed directly thereon or thereover. The optical layer 318 may include an infrared filter and/or an antireflective coating, in some embodiments. In other embodiments, the optical layer 318 may be omitted or may include an antireflective coating without an infrared filter or other color filter. Additionally, some embodiments of the optical layer 318 may include a visible wavelength filter that blocks or inhibits light in the visible spectrum while permitting other light, such as infrared light of a predetermined wavelength range, to be received by the optical sensor 312. In some embodiments, the optical sensor 312 may be another type of sensor, such as a ToF sensor that detects the time delay or phase difference between direct and reflected transmissions of an emitted light wave or light signal, such as light emitted by the light projector device 250 of FIG. 2. As is described further herein, ToF sensors may be configured to identify a phase signal included in the emitted light as part of a phase differentiation process, and a phase difference recovered from the reflected phase signal may be utilized in determining depth, as described herein in further detail.

The imaging device 310A may further include an optical matrix 320, disposed along the optical axis 314 and between the lens 316 (which may represent multiple lenses) and the optical sensor 312. The optical matrix 320 may be a set or matrix of filters, lenses, lenslets, prisms, refractive arrays, and/or other optical elements that can alter light directed by the lens 316 to the optical sensor 312 by altering a direction of the light, focusing the light on a particular region of the optical sensor 312, and/or introducing a phase delay into the light. Unlike a single lens, some embodiments of the optical matrix 320 may have a discontinuous impact on the light passing therethrough, such that the effect of the optical matrix 320 may not be described by a continuous function along the surface of the optical matrix 320. Rather, the optical matrix 320 may generate a desired interference pattern. The optical matrix 320 may have a matrix of variable-phase optical elements present on at least one surface. As shown in FIG. 3A, the optical matrix 320 may include a matrix of variable-phase optical elements at least on the side of the optical matrix 320 closest to the optical sensor 312. In some embodiments described herein, the optical matrix 320 may be a DOE, as is described in greater detail below.

DOEs may operate by using interference and diffraction to produce a desired change in the light passing through. For example, based on the pattern of optical elements on a particular DOE, the DOE can operate as a beam shaper to produce a desired pattern in the transmitted light. The optical matrix 320 may include a matrix of optical elements that cause light to be directed in a desired pattern to individual pixels or sets of pixels in the optical sensor 312. Accordingly, DOEs may be used in some embodiments of the optical matrix 320 to direct light and/or to introduce desired phase delays into light that is directed to specific pixels in the optical sensor 312. Some examples of patterns that may be induced by a DOE are included in FIGS. 6B-6G, which are described further below in detail.

The optical matrix 320 may be coupled to the lens 316 and the optical sensor 312 in a variety of ways. For example, an edge or edges of the optical matrix 320 may be mechanically secured between the lens 316 and the optical sensor 312 by a housing 322 (e.g., housing 322 may include corresponding recesses or channels formed that match external dimensions of the lens 316). The lens 316 may also be secured to the housing 322 by chemical means, such as an adhesive. The housing 322 may be similarly coupled to the optical matrix 320. For example, the optical matrix 320 may be coupled to the housing 322 in a fixed relationship, such as by an adhesive or secure press-fit relationship, or in a movable relationship, such that the optical matrix 320 may be moved relative to the housing 322 in at least one dimension and thereby moved relative to the optical sensor 312 at least one dimension. For example, the optical element matrix 320 may include portions positioned within one or more channels 324 formed in an interior wall of the housing 322 that constrains the optical matrix 320 to movement in two dimensions substantially parallel to the optical sensor 312.

Additionally or alternatively, the optical matrix 320 may be secured to the housing 322 by one or more components of a positioning system 326. As shown in FIG. 3A, depicted components of the positioning system 326 may be referred to individually as a positioning component 326A and a positioning component 326B. The component or components of the positioning system 326 may be provided by one or more micro-electromechanical systems (MEMS) actuators or devices, voice coil motors, or other small-scale active positioning components suitable for integration into the imaging device 310A.

By operation of circuitry included on the optical sensor 312 or an external processing device, the optical matrix 320 may be positioned in a controlled manner in a plane substantially parallel to the optical sensor 312 itself and orthogonal to the optical axis 314. In some embodiments, the optical matrix 320 may further be movable along the optical axis 314 by the positioning system 326. When the optical matrix 320 is moved parallel to the optical sensor 312, light directed to an individual element of the optical matrix 320 may be redirected from a first pixel or first set of pixels of the optical sensor 312 to a second pixel or second set of pixels of the optical sensor 312. Accordingly, movement of the optical matrix 320 may result in a corresponding movement in the FOV of any given pixel (e.g., the iFOV of a pixel) in the optical matrix 320. In some embodiments, the light directed to the first pixel or first set of pixels may have a different phase delay after the optical matrix 320 is moved than before such movement.

FIG. 3B depicts a cross-sectional diagram of an exemplary imaging device 310B, according to some embodiments. The imaging device 310B shares many of the features previously described in conjunction with the imaging device 310A of FIG. 3A. The imaging device 310B may include an optical sensor 312 and a lens 316 secured within a housing 322. The imaging device 310B may further include an optical matrix, like the optical matrix 320 of FIG. 3A. The optical matrix of FIG. 3B may be referred to as a DOE 330, but may be provided by another type of optical matrix in other embodiments. The DOE 330 may be a substantially planar structure having at least one modified surface with a matrix of variable-phase optical elements thereon. The phrase "substantially planar," in some embodiments, may refer to an element (e.g., DOE 330) having a functional portion that is planar or that deviates from a plane to provide grating features, as a result of manufacturing imperfections, etc. Additionally, patterned features that make up the matrix on the modified surface may include multiple features having the same height, such that the features may be situated below a common plane. The variable-phase optical elements of the DOE 330 may be formed by shaped features protruding from or being recessed into a substrate. The DOE 330 may have a surface pattern that refracts the light received from the lens 316 into a particular pattern transmitted to the optical sensor 312 and/or may introduce a plurality of different phase delays into light passing through from the lens 316 to the optical sensor 312.

While some embodiments of the DOE 330 may include patterned features forming a matrix of variable-phase optical elements on one side (shown in FIG. 3B, the features are formed on the side of the DOE 330 closest to the optical sensor 312), some embodiments may include such features on both sides of the DOE 330. In some embodiments, one or more microlenses, like the microlens 332, may be disposed on the side of the DOE 330 closest to the lens 316. The microlenses may be sized and positioned so as to follow a pattern with respect to the DOE 330 and/or a pixel pattern and pitch of optical sensor 312. Some exemplary embodiments of the DOE 330 are shown FIGS. 4A-D.

FIGS. 4A, 4B, 4C, and 4D are cross-sectional diagrams of exemplary DOEs that each include matrices of variable-phase optical elements, according to some embodiments. The substrates and features of the DOEs may be formed from optical glass, such as fused silica or another type of glass, or from various polymer materials. The DOEs may be patterned by an etching process or by a deposition or embossing process, in some embodiments.

Figure 4A:
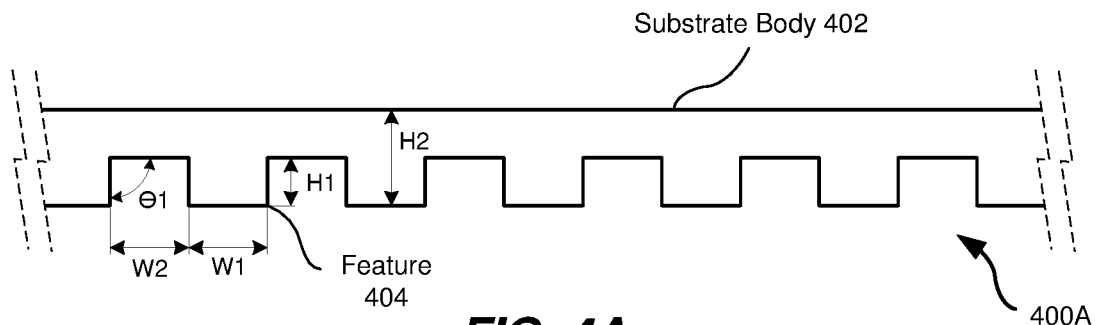
FIGS. 4A, 4B, 4C, and 4D are cross-sectional diagrams of exemplary matrices of variable-phase optical elements, according to some embodiments.

As shown in FIG. 4A, the DOE 400A may have a main substrate body 402 and a plurality of optical features 404 formed on or in the main substrate body 402. The feature 404 may be a simple step feature forming a square-wave-like profile on the surface of the body 402. The feature 404 may have a height H1 and a width W1, each of which may be any suitable length. In some embodiments, the height H1 may be in a range from about 10 nanometers (nm), 50 nm, or 100 nm, to about 1 micron, 2 microns, or more. The height may be determined based on a wavelength of a known light source and optical properties attributable to the material(s) of the body 402 and features 404. The width W1 may range from about 500 nm to about 5 microns, in some embodiments. As another example, the total height H2 through the thickest part of the DOE 400A may be in a range from about 100 nm to about 800 microns. Furthermore, in some embodiments, the width W2 of the gaps between the features 404 may be the same as or different than the width W1. In some examples, the width W2 may be in a range from about 500 nm to about 5 microns. The sidewalls of the features 404 may form an angle θ1 with the substrate body 402. In some embodiments, the angle θ1 may be in a range from about 85° to about 95°. In other embodiments, the angle θ1 may be in a range from about 90° to about 175°. Examples of DOEs having greater angles may be seen in FIGS. 4C and 4D.

While the DOE 400A in FIG. 4A is depicted as having identically sized features, in height and width, separated by identical widths, some embodiments of the DOE 330 of FIG. 3B may include more complicated, but repeating, patterns of optical features. The patterns may correspond to aspects of the optical sensor 312, such as the size of the pixels of the optical sensor 312. Additionally, the heights of features 404, like the height H1, may correspond to specific wavelengths of light. For example, when the projector device 250 of FIG. 2 is known to emit or project light in a narrow wavelength band around 850 nm, the DOE 330 or 400A (or any other such optical matrix having a repeating pattern of variable-phase optical elements) may have features with a height H1 that is a predetermined fraction of the wavelength. For example, when the wavelength of projected light is around 850 nm, one feature 404 may have a height H1 of about 212.5 nm (one-fourth), a height of about 425 nm (one-half), a height of about 637.5 (three-fourths), or a height of about 850 nm. Some embodiments of the DOE 400A may include features 404 having all of these exemplary heights. In some embodiments, the heights may be modified based on the refractive index or other material properties of the DOE. Accordingly, the heights of the features of a DOE or other optical matrix may be a function of a predetermined wavelength of light produced by the light source 252 of FIG. 2 and/or a function of the material/optical properties of the DOE, such as the refractive index of the material(s).

Figure 4B:
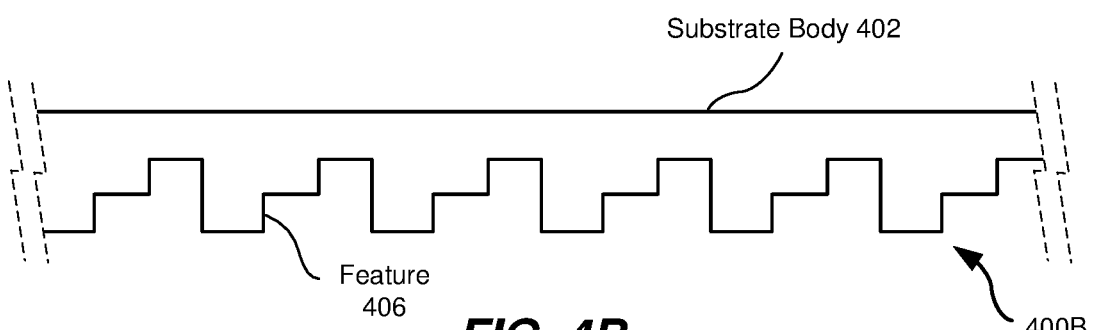
Figure 4C:
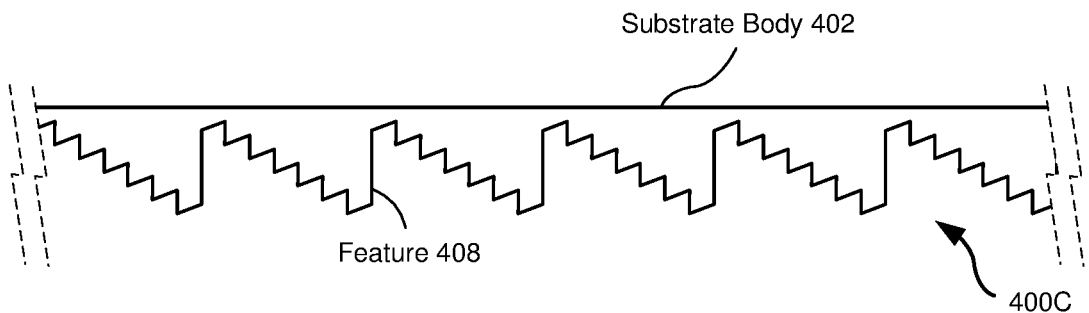
Figure 4D:
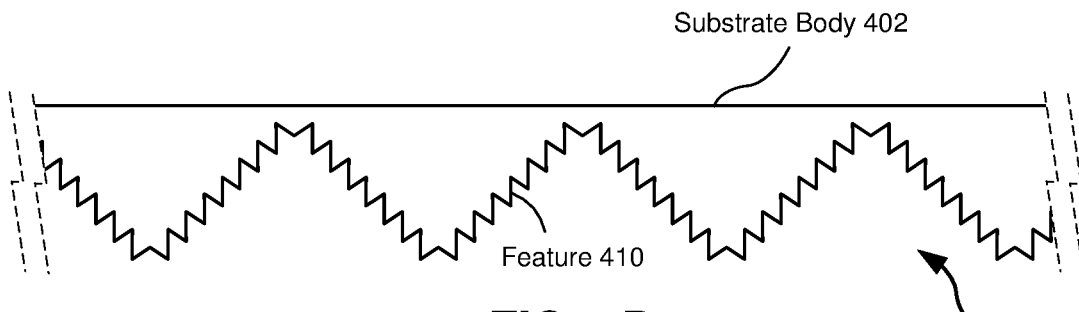

FIG. 4B depicts a cross-section of a DOE 400B having a compound step feature 406. The repeating feature 406 includes multiple steps, each having a different height over the main body 402. FIGS. 4C and 4D include depictions of cross-sections of DOEs 400C and 400D, respectively, that have even more complex surfaces provided by the features 408 and 410, respectively. The DOEs or other optical components described herein may be patterned identically or differently in x- and y-directions. The features and patterns of features included in embodiments of the DOEs 400A-D and other optical matrixes described herein may have different periods, such that features may be separated by 1 micron, 2 microns, 4 microns, etc., in various embodiments.

Returning to FIGS. 3A-3D, FIG. 3C depicts an imaging device 310C that may be similar in many respects to the imaging devices 310A and 310B of FIGS. 3A and 3B, respectively. The imaging device 310C may include the optical sensor 312, the lens 316, and the optical matrix 320, which may all be secured to the housing 322. As described herein, the optical matrix 320 may be secured to the housing 322 by one or more positioning components of a positioning system 326. The imaging device 310C may further include an additional optical matrix 340 that is secured to the housing 322 by additional components of the positioning system 326. The optical matrices 320 and 340 may be understood as a stacked optical matrix. As shown in FIG. 3C, the optical matrix 340 may be secured to the housing 322 by positioning components 342A and 342B, which may be similar to the positioning components 326A and 326B of the positioning system 326. The positioning components 342A and 342B may be actuated separately from the other positioning components of the positioning system 326, such that the optical matrix 320 may be positioned and repositioned separately from the optical matrix 340. While the depicted embodiment of FIG. 3C shows both of the optical matrices 320 and 340 as being moveable, some embodiments of the imaging device 310C may have one or both of the optical matrices 320 and 340 fixed in position relative to the optical sensor 312 and the optical axis 314. The optical matrices may be patterned with patterns having different periodicities and/or orientations. For example, the optical matrix 320 may have a pattern of linear protrusions extending in a first direction while the optical matrix 340 may have a pattern of linear protrusions extending in a second, orthogonal direction.

In some embodiments, the optical matrix 320 and the optical matrix 340 may be considered as layers or components in a single stacked optical matrix, such that the optical matrix has additional dimensions. For example, the optical matrix 320 of FIGS. 3A and 3B may include a first layer of optical elements provided by a first DOE and may further include a second layer of optical elements provided by a second DOE. The first and second DOEs can be fixed in relation to each other or can be moveable.

FIG. 3D depicts a cross-sectional view of an imaging device 310D, which may be similar to the imaging devices 310A-310C of FIGS. 3A-3C. The imaging device 310D may include an optical sensor 312, a lens 316, and one or more additional optical components secured to a housing 322. Accordingly, the imaging device 310D may include a stacked configuration of optical components, such as a stacked configuration of the optical matrices 320 and 340. In a stacked configuration of optical components, multiple optical components disposed along the optical axis 314 and between the lens 315 and the optical sensor 312, may be used to alter light passing therethrough toward the optical sensor 312. Each component may add a predetermined alteration, such as a predetermined phase delay, change in direction, or change in associated iFOV. Accordingly, the optical components in a stacked configuration may cooperate to provide a desired effect on the light directed toward the optical sensor 312, as is described further in additional portions of the present disclosure.

The imaging device 310D may further include a hyperspectral filter 350. The hyperspectral filter 350 may include a plurality of filter windows, with each window or type of window passing a specific wavelength of light. In some embodiments, the windows may be formed by depositing material layers on a substrate that is transparent to a broad range of wavelengths. In some embodiments, the windows are formed such that they extend in lines across a main substrate of the filter 350. In other embodiments, the windows may be tiled or mosaiced windows, such that each pixel has a corresponding window or that sets of pixels (e.g., 4 pixels by 4 pixels, 4 by 8 pixels, 10 pixels by 10 pixels, etc.) are associated with a particular window. The tiled or mosaiced windows in the hyperspectral filter 350 may be arranged in a repeating pattern across the surface of the hyperspectral filter 350. In embodiments including the hyperspectral filter 350, the optical matrix 320 and/or the optical sensor 312 may omit a color-filter array deposited thereon. Additionally, in some embodiments of the imaging device 310D, the hyperspectral filter 350 may be secured to the housing 322 by fixed or movable positioning components, like those described herein for securing optical matrices to housings.

Embodiments of the instant disclosure may enable spatial oversampling and/or spectral oversampling within hyperspectral imaging systems. Movement of an optical component of the imaging device 310D may provide for spectral oversampling by shifting an iFOV of a scene such that the iFOV is captured through a filter of an initial wavelength spectrum in a first position and through a filter of a different wavelength spectrum in a second position. For example, either or both of the optical matrix 320 and/or the optical matrix 340 may be moved, causing an iFOV of a particular pixel to shift to be captured via a different spectral filter. By capturing an iFOV of a scene via multiple different filters, a higher resolution spectral image may be created.

To provide spatial oversampling, the imaging device 310D may be used to capture a first perspective of a scene when the optical component, e.g. the optical matrix 320, is in a first position and is directing filtered light through a first filter window to the first pixel and to capture a second perspective of the scene when the optical component is in a second position and is directing filtered light through the first filter window to the first pixel. In other words, the optical matrix 320, when in a first position, may enable a pixel (or set of pixels) to capture a first iFOV through a particular spectral filter. When moved to the second position, optical matrix 320 may enable the pixel (or set of pixels) to capture a second iFOV through the same spectral filter. To produce an enhanced hyperspectral image, information collected from the pixels at different times, i.e., when the moveable optical matrices 320 and/or 340 are in different positional configurations, may be combined by the processing subsystem 110 of FIG. 1 to create the output image with increased spatial resolution.

Figure 5A:
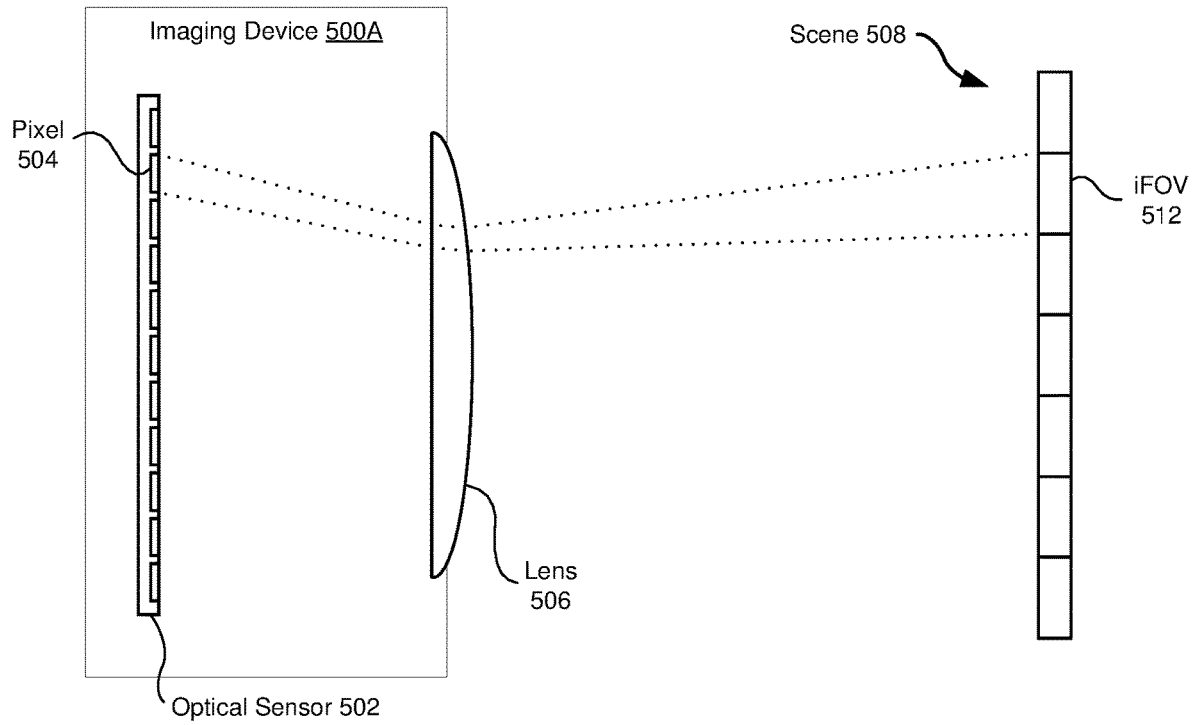
FIGS. 5A, 5B, 5C, and 5D are cross-sectional diagrams of an imaging device and a scene being imaged therewith, according to some embodiments.

FIGS. 5A, 5B, 5C, and 5D are cross-sectional diagrams of an exemplary imaging device and an object being imaged therewith, according to some embodiments. FIGS. 5A-5D may provide an example of how an optical component, such as an optical matrix as described herein, may alter the iFOV of a given pixel or set of pixels. As shown in FIG. 5A, an imaging device 500A may include an optical sensor 502 having a plurality of pixels thereon, including a pixel 504, and a lens 506 that focuses a portion of light from a scene 508 on the pixel 504, as depicted. Each pixel of the sensor 502 may have an iFOV defining a portion of the scene 508. The iFOV of a given pixel may be expressed in terms of angles, but is shown, for convenience, as a flat portion of the scene 508, in FIG. 5A. The imaging device 500A does not include a positionable optical component, such as an optical matrix or another optical component, according to aspects of the present disclosure.

Figure 5B:
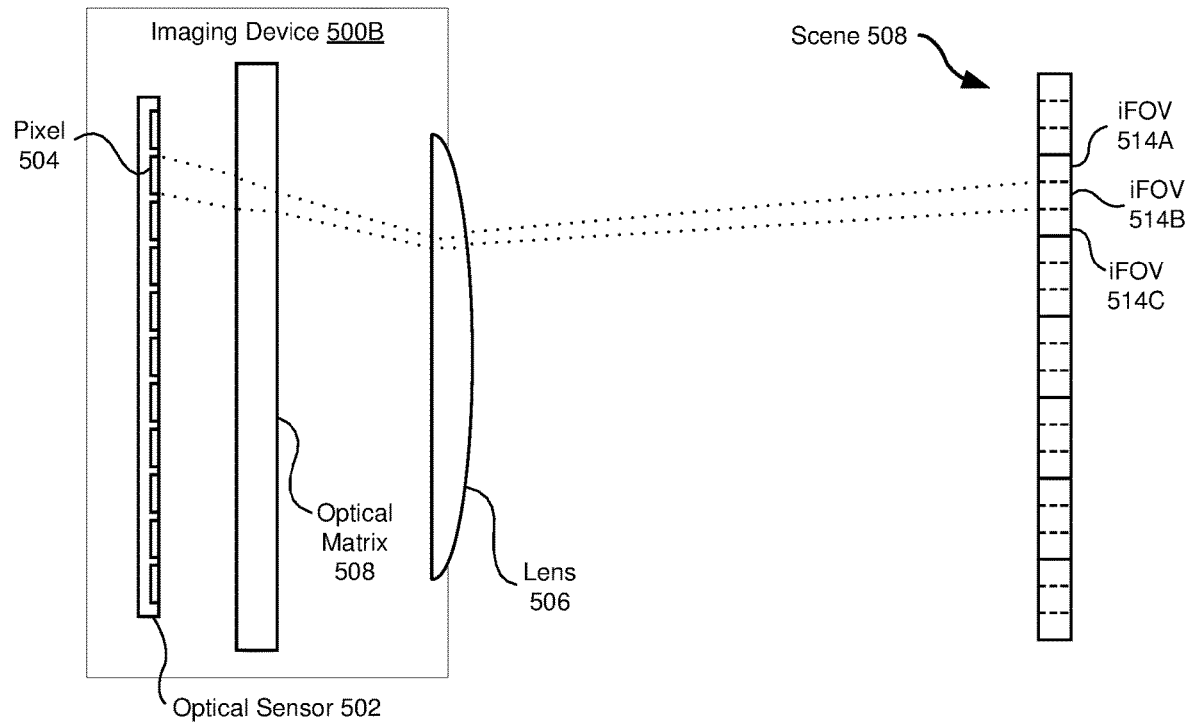

FIG. 5B depicts an imaging device 500B that may include the optical sensor 502, the lens 506, and an optical matrix 510. Additionally, some implementations of the imaging device 500B may include the hyperspectral filter 350 of FIG. 3D disposed between the lens 506 and the optical sensor 502. As described herein, the optical matrix 510 may include a matrix of variable-phase optical elements and may be provided by an array of lenses, gratings, or by a DOE, etc. The optical matrix 510 may cause the iFOV associated with the pixel 504 to decrease in size, from the iFOV 512 of FIG. 5A to the iFOV 514B of FIG. 5B.

Figure 5C:
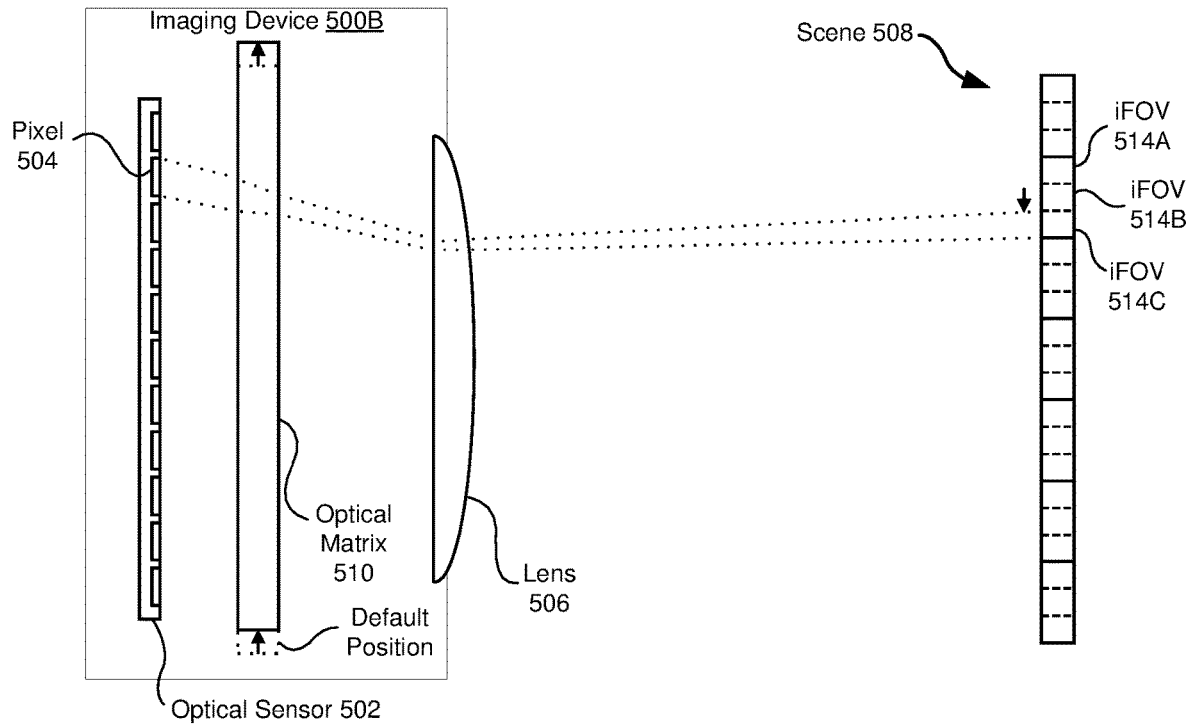
Figure 5D:
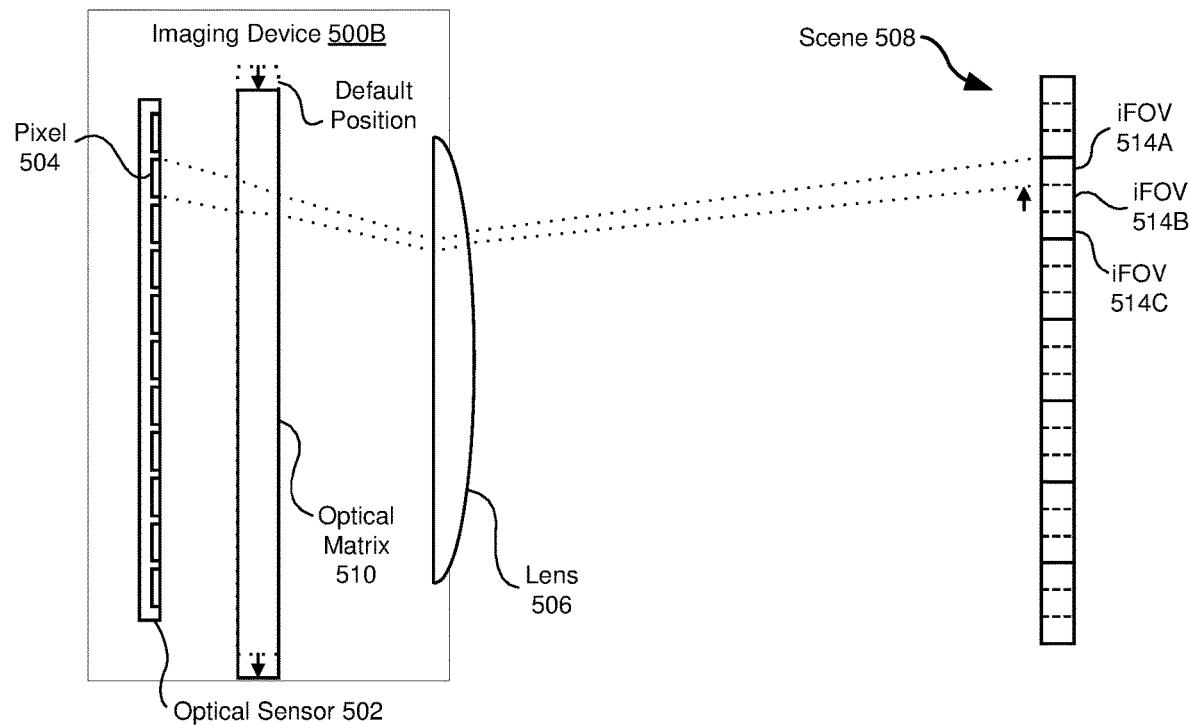

As shown in FIGS. 5C and 5D, the optical matrix 510 may be moved or displaced parallel to the optical sensor 502. When the optical matrix 510 is moved or repositioned parallel to the optical sensor 502, the iFOV of the pixel 504 may shift. The iFOV may shift in a direction opposite to the movement. As shown in FIG. 5C, the optical matrix 510 may move up from the default position, which may cause the FOV of the pixel 504 to shift on the scene 508 to iFOV 514C. As shown in FIG. 5D, the optical matrix 510 may move down from the default position, which may cause the FOV of the pixel 504 to shift on the scene 508 to iFOV 514A.

By operating as shown in FIGS. 5B-D, the optical matrix 510 may be moved to permit a different portion of the scene to be imaged by the pixel 504; i.e., movement of the optical matrix 510 may cause the pixel 504 to sample a different portion of the scene 508. This may be done to oversample a scene or to cause a different part of the scene 508 to be imaged through a particular filter window of a hyperspectral filter, like the filter 350 of FIG. 3D. Furthermore, while FIG. 5 shows the optical matrix 510 being moved along a single axis within a single dimension, the optical matrix 510 may be moved within multiple axis and dimensions.

Figure 6A:
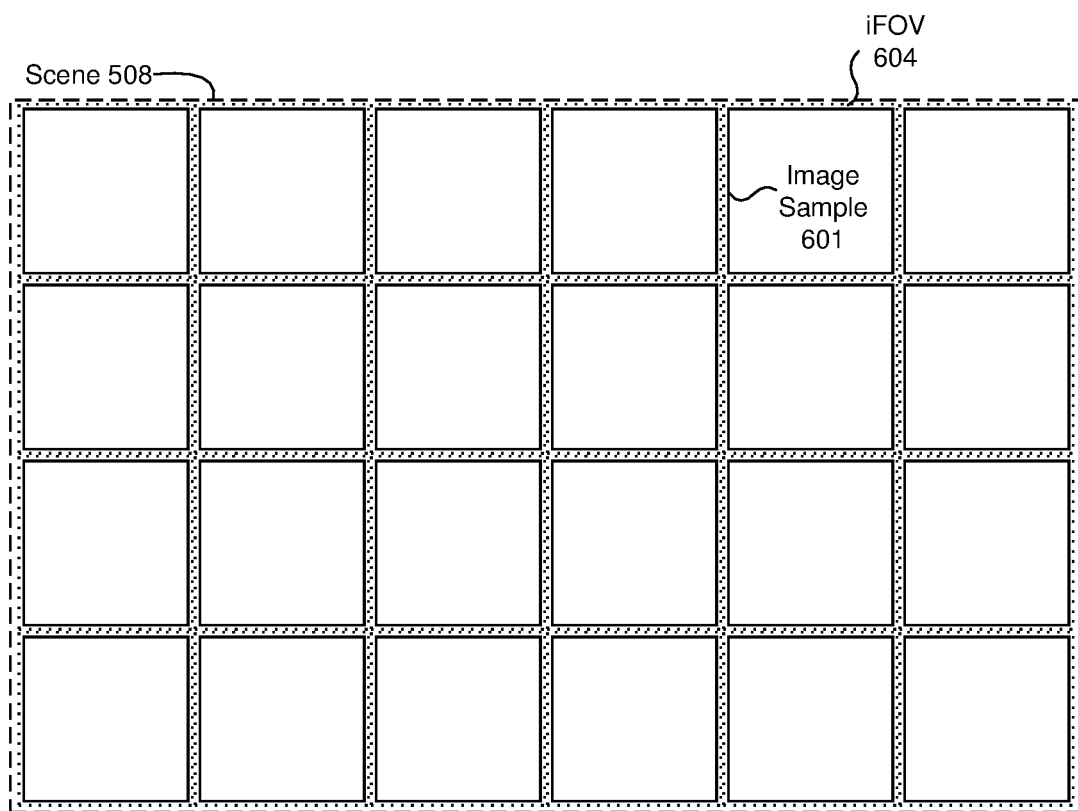
FIGS. 6A, 6B, and 6C show a conventionally sampled field of view (FOV) and an oversampled FOV, according to some embodiments.
Figure 6B:
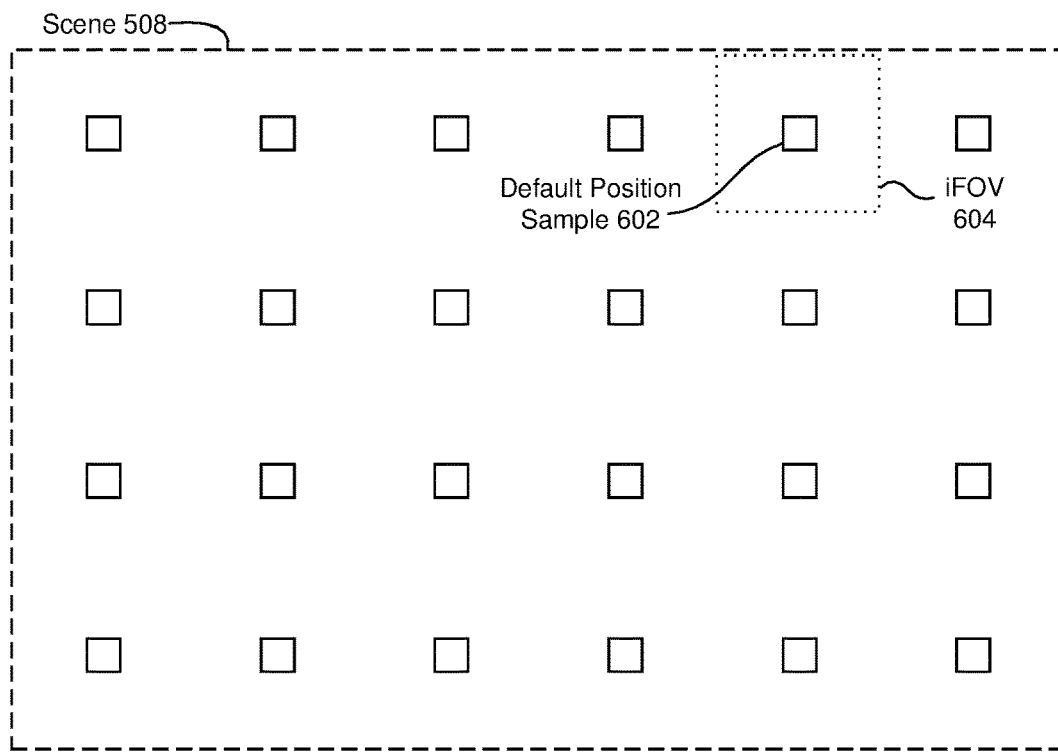
Figure 6C:
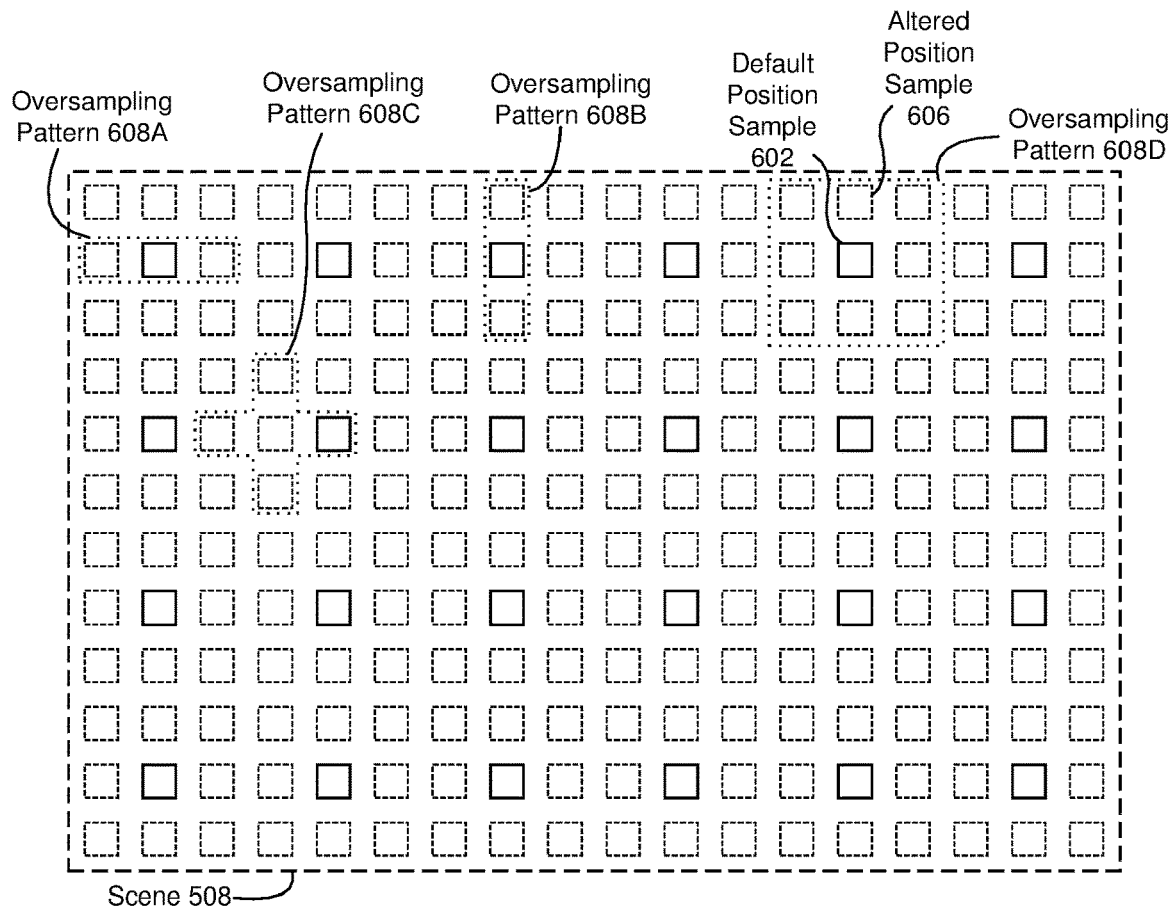

FIG. 6A shows a conventionally sampled FOV of a scene, and FIGS. 6B and 6C show oversampling of the FOV of the same scene, according to some embodiments. When imaging a scene with an imaging device that does not include an optical matrix 510, a sample may be obtained for an unaltered iFOV 604. As shown in FIG. 6A, the area of the image sample 601 approximately or exactly corresponds to the iFOV 604. That portion of the scene 508 may then be represented in an image (e.g., a two-dimensional image, a three-dimensional hyperspectral image (one dimension being defined by wavelength), or a three-dimensional depth map image) by the data collected in the image sample 601, which represents the portion of the scene 508 shown in iFOV 604.

When an optical matrix 510 is included in the imaging device, more detailed information may be obtained from the scene 508. In some embodiments, multiple optical components or a single optical component may be included in an imaging system and may be moveable in one or more directions while remaining parallel to the optical sensor of an imaging device. By including an optical component, such as an optical matrix, in the optical path of an imaging device, the iFOVs of the pixels of the imaging device may be decreased, as shown by the default position sample 602 of FIG. 6B. The image resolution, measured in pixels, may be the same when using the system capturing the scene 508 of FIG. 6A or the system capturing the scene 508 as shown in FIG. 6B. However, by moving the optical matrix, such as the optical matrix 510 of FIGS. 5B-5D, the scene 508 may be oversampled relative to the fixed FOV associated with the pixel, producing a more detailed image. Oversampling may permit any given pixel to capture additional information from the scene 508, by changing size of the iFOV of the pixel and by shifting the FOV of the pixel relative to the scene 508. As shown in FIG. 6C, when the optical matrix 510 is displaced, the pixel may capture the altered position sample 606 rather than the default position sample 602. By moving linearly along a single axis, samples may be obtained on either side of the FOV provided by the default position. Linear movement of the optical matrix 510 may provide for the oversampling pattern 608A or the oversampling pattern 608B. Combined linear movement in orthogonal directions may provide for capturing information in the oversampling patterns 608C and 608D. Additionally, coordinated movement of multiple optical components, such as the optical matrices 320 and 340 may provide for extended oversampling patterns, which may permit additional information to be encoded by the optical sensor 312.

To perform oversampling, multiple images may be combined into one image or frame. For example, a first image may be captured by the optical sensor 312 while the optical matrix 510 is in the default position, corresponding to a default perspective on the scene 508. When the optical matrix 510 is moved, a second image may be captured by the optical sensor 312, the second image corresponding to a different perspective on the scene 508. Accordingly, to capture the three samples shown in the oversampling pattern 608A or 608B, three perspectives may be captured. Similarly, for the oversampling pattern 608C, four perspectives may be captured, and for the oversampling pattern 608D, nine perspectives may be captured. These additional perspectives may be captured in an image. Such images, which may be intended to be combined into a single output image or output frame, may be referred to as intermediate images. By combining the information from the intermediate images according to information characterizing the corresponding positions, the images may be properly combined into a final output image or frame.

Intermediate images may be combined in any suitable manner using any suitable process. For example, intermediate images may be combined in an interpolation process that interpolates data points between pixel data of two different intermediate images (e.g., two different perspectives or iFOVs). For example, the values defining the altered position sample 606 and the default position sample 602 may be combined, such as by averaging, to estimate an intermediate position sample. Such interpolation may increase resolution of the scene in one or more dimensions. For example, a processing subsystem may combine a first intermediate image, a second intermediate image, and interpolated pixel data into an increased-resolution output image.

FIGS. 6D, 6E, 6F and 6G are perspective views showing light interacting with an imaging system, according to some embodiments. FIGS. 6D-6G show the effects of different optical matrices on a wavefront 610 passing from the lens 316 to the optical sensor 312, as in any of the imaging devices of FIGS. 3A-3D. Individual pixels of the optical sensor 312 are depicted, such as the exemplary pixel 612. While the exemplary pixels, like the pixel 612, are depicted as generally square in shape, other pixel shapes may be utilized in some other embodiments. In FIGS. 6D-6G, exemplary portions of the lens 316, optical sensor 312, and optical matrices are shown. For example, the optical sensor 312 may include more (or fewer) pixels than the 5×5 pixel array depicted. Similarly, the optical matrices may include more (or fewer) features than explicitly illustrated.

Figure 6D:
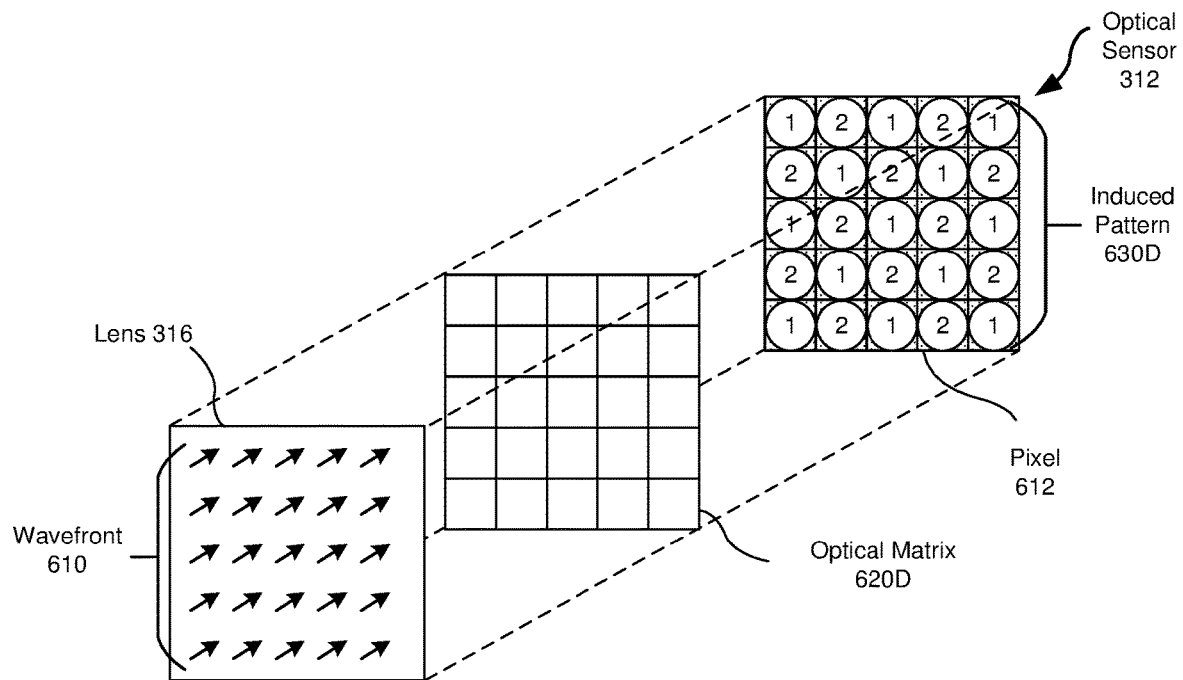
FIGS. 6D, 6E, 6F and 6G show perspective views of light interacting with an imaging system, according to some embodiments.

As shown in FIG. 6D, the wavefront 610 may be directed by the lens 316 toward the optical sensor 312 and may pass through an optical matrix 620D. The optical matrix 620D may introduce a plurality of phase delays into the wavefront 610. The phase delays may be introduced in a pattern, such as the induced pattern 630D shown over the optical sensor 312. The induced pattern 630D may include two different phase delays labeled with a "1" and a "2" as shown in FIG. 6D. The induced pattern 630D may include an alternating pattern such that the exemplary pixel 612, having a phase delay 1, may be bordered in both the horizontal and vertical directions by pixels receiving light having the phase delay 2. Other patterns may be induced by the optical matrix 620D in other embodiments. The optical matrix 620D may additionally affect the focus of the wavefront 610 with respect to the optical sensor 312 such that only a limited portion of each pixel 612 may receive light. In some embodiments, the optical matrix 620D, or other optical matrices described herein, may cause light to be incident on less than 75%, 50%, or 25% of the photosensitive area of each pixel.

Figure 6E:
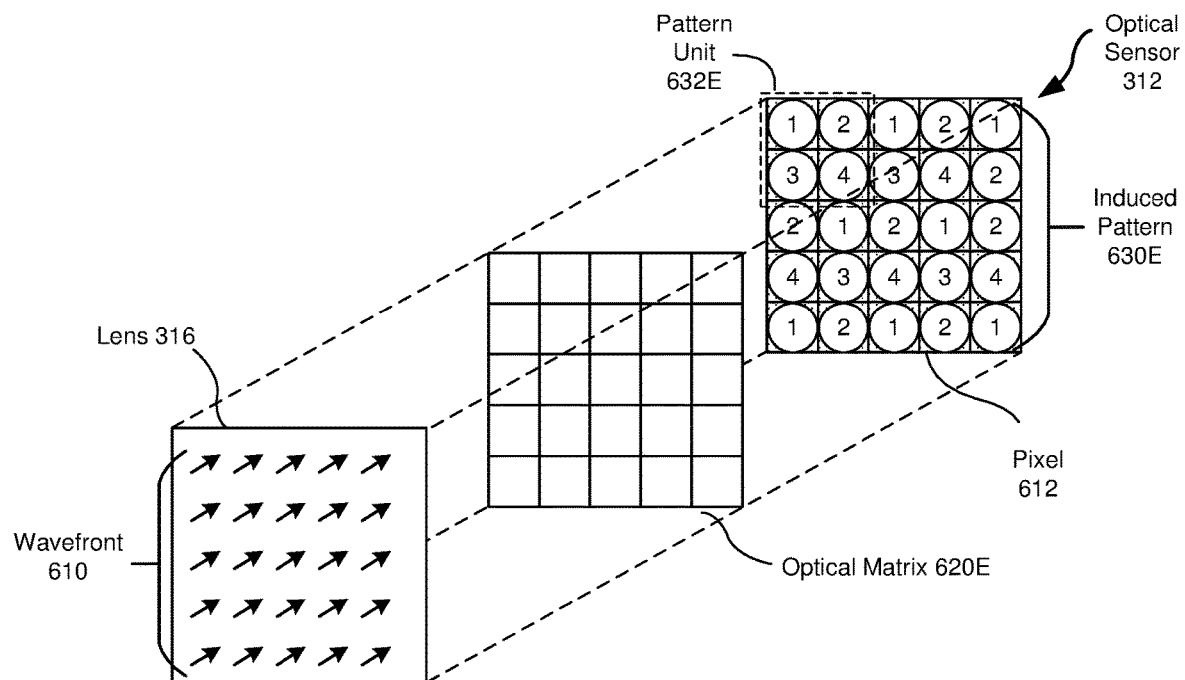

FIG. 6E depicts the effects on the wavefront 610 of an optical matrix 620E, which may be different from the optical matrix 620D of FIG. 6D in at least some respects. Light of the wavefront 610 may be directed by the lens 316 through the optical matrix 620E and may produce the induced pattern 630E on the optical sensor 312. The optical matrix 620E may be patterned such that it produces more than two different phase delays. As illustrated, the optical matrix 620E may produce four different phase delays, labeled with "1," "2," "3," and "4" in FIG. 6E. In some embodiments, the differences between the induced phase delays 1, 2, 3, and 4 may be a predetermined phase difference, such as 45° or 90°. As shown in FIG. 6E, the optical matrix 620E introduces the induced pattern 630E having the four different phase delays arranged in a square pattern unit 632E. In other embodiments, the optical matrix 620E may include a linear pattern unit that includes each of the four phase delays in a linear configuration or a horizontal line.

Figure 6F:
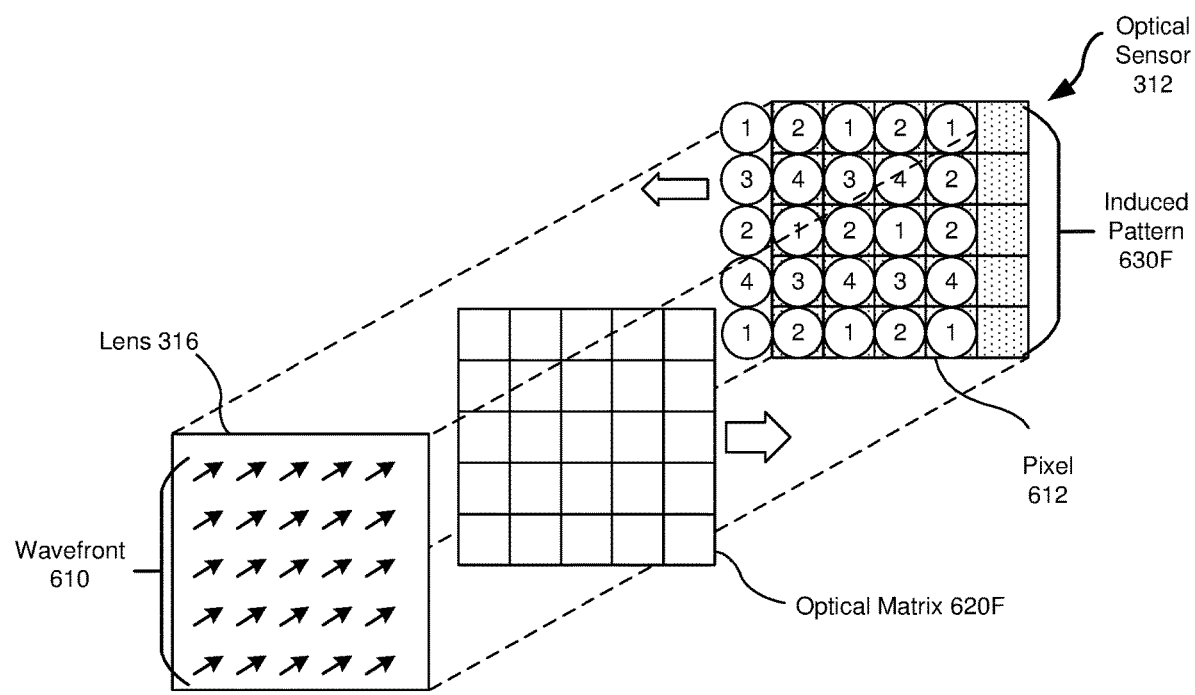

FIG. 6F depicts an effect of an exemplary movement or repositioning of an optical matrix 620F, which may be similar to the optical matrix 620E, according to some embodiments. As shown, the optical matrix 620F may be moved relative to the optical sensor 312. For example, a positioning system including one or more positioning components may cause the optical matrix 620F to move in a first direction that is substantially parallel to the optical sensor 312. This movement of the optical matrix 620F may cause a corresponding movement of the pattern produced by the optical matrix 620F, with respect to the optical sensor 312 and its individual pixels. The movement may shift the induced pattern 630F. As shown, the movement of the optical matrix 620F in the first direction may produce a shift of the induced pattern 630F in a direction opposite to the first direction, in some embodiments. Because of the movement, a portion of the pattern 630F may not be incident on the portion of the optical sensor 312 shown in FIG. 6F. Comparing FIGS. 6E and 6F, the exemplary pixel 612 may receive light having the phase delay 2 when the optical matrix is in a default position and may receive light having the phase delay 1 when the optical matrix is in an altered position.

Figure 6G:
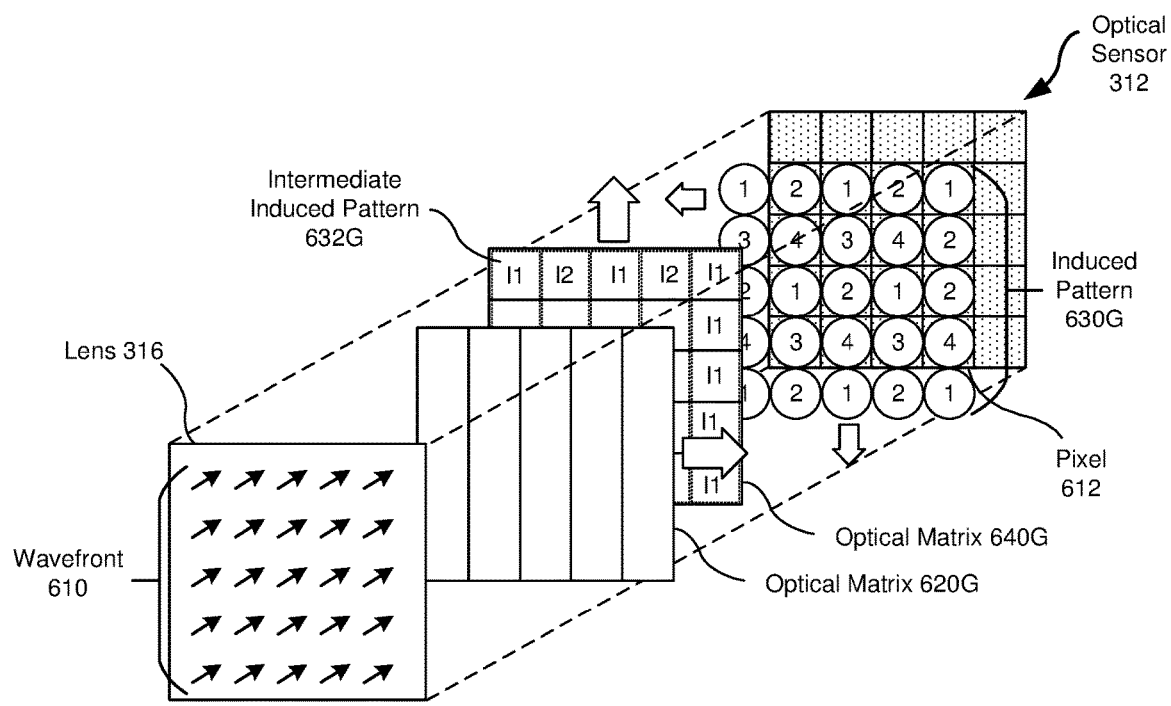

FIG. 6G depicts an embodiment of an imaging device having a stacked configuration of variable-phase optical elements provided by more than one optical matrix in its optical path from the lens 316 to the optical sensor 312, such as the imaging devices 310C and 310D of FIGS. 3C and 3D. The wavefront 610 may pass through a first optical matrix 620G and then a second optical matrix 640G before reaching the optical sensor 312. In some embodiments, the optical matrixes 620G and 640G may both be patterned such that each produces two different phase delays. As shown in FIG. 6G, the optical matrix 620G may induce an intermediate induced pattern 632G, which may alternate between a first intermediate phase delay I1 and a second intermediate phase delay I2. As light from the wavefront 610 passes through both the optical matrices 620G and 640G the combined effects of the phase delays introduced by each of the optical matrices 620G and 640G may result in a pattern having four different phase delays, as shown by the induced pattern 630G.

In some embodiments, one or more of the optical matrices 620G and 640G may be fixed. As shown, the optical matrix 620G may be moved from a default position in a first direction substantially parallel to the optical sensor 312, while the optical matrix 640G may be moved in a second direction that may also be substantially parallel to the optical sensor 312. As shown, the second direction may be orthogonal to the first direction. The combined movements of the optical matrices 620G and 640G may produce a shift or movement of the induced pattern 630G in directions opposite to the movement of the optical matrices 620G and 640G, such that the pattern 630G is shifted diagonally with respect to the optical sensor 312. For example, the matrices 620G and 640G may induce a phase delay 2 in the light incident on the pixel 612 while the matrices 620G and 640G are in a default position. FIG. 6G shows that, when both the matrices 620G and 640G are moved to new positions, the matrices 620G and 640G may cause the light incident on the pixel 612 to have a phase delay 4.

While FIGS. 6D-6G may illustrate some potential effects of some examples of optical matrices and their movements, embodiments of the present disclosure may include other types of movements, such as rotational or other non-linear movements of optical matrices, which may produce more complicated interference patterns based on the disclosed principles. Similarly, other patterns of phase delays may be induced by other embodiments of optical matrices. Furthermore, while FIGS. 6D-6G are discussed with respect to the phase delays produced by optical matrices, the induced patterns may be understood with respect to windows in a hyperspectral filter, like the hyperspectral filter 350 of FIG. 3D. For example, the numerals 1, 2, 3, and 4 in FIGS. 6E-6G discussed above as identifying phase delays may also be understood as identifying patterned light passing through filter windows of the hyperspectral filter 350, such that the pixels of the optical sensor 312 may capture light through different windows at different times as the optical matrix or optical matrices are repositioned.

Figure 7A:
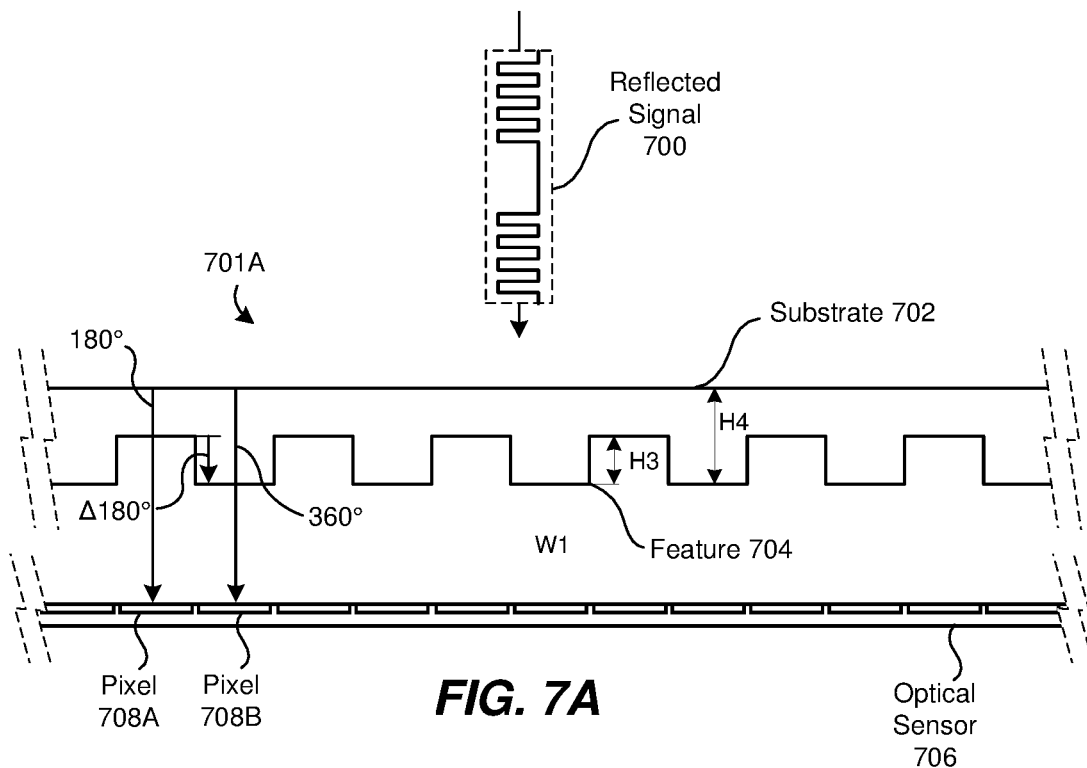
FIGS. 7A and 7B are cross-sectional diagrams of an optically demodulating depth sensor device, according to some embodiments.
Figure 7B:
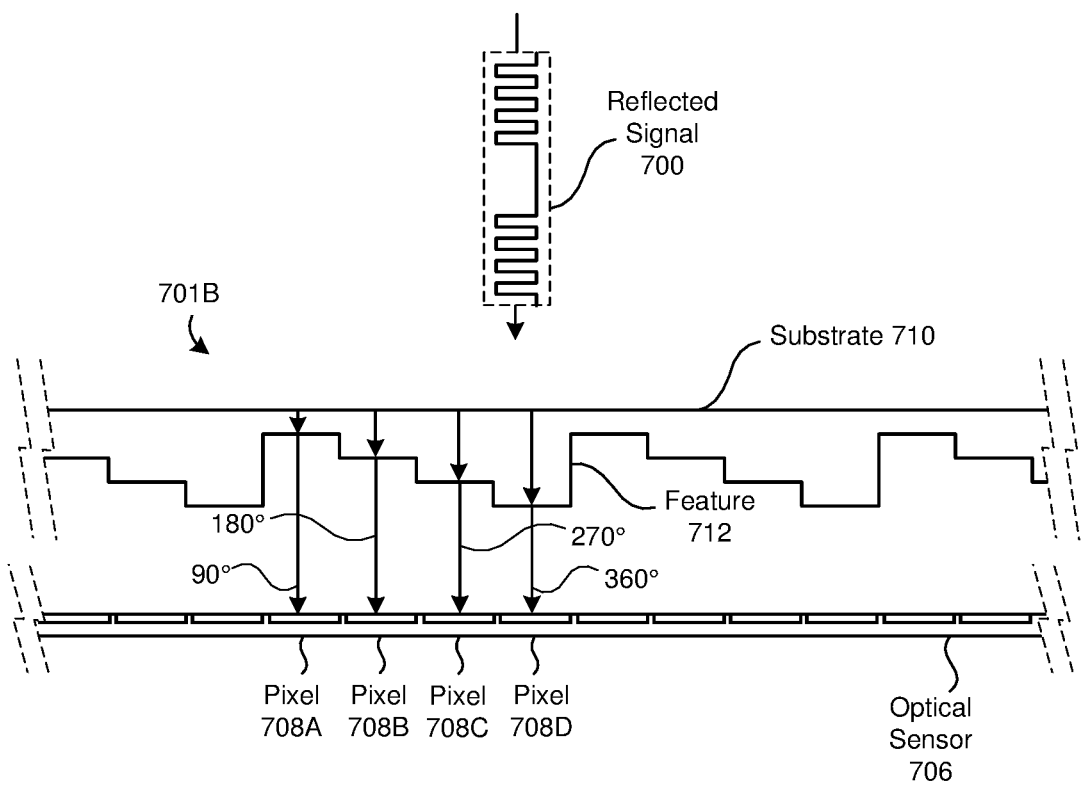

FIGS. 7A and 7B are cross-sectional diagrams of an optically demodulating depth sensor device, such as a phase-based depth sensor, according to some embodiments. FIGS. 7A and 7B depict embodiments of portions of an imaging device, such as the imaging device 310B of FIG. 3B. As shown in FIG. 7A, a reflected signal 700 may be directed by a lens, such as the lens 316 of FIG. 3B, toward an optical matrix 701A. The optical matrix 701A may introduce first and second phase delays into the reflected signal 700. The reflected signal 700 may be formed from light of a known wavelength, such as light around 850 nm. The light of the reflected signal 700 may be modulated. For example, the light may be modulated to produce a continuous waveform, such as a sinusoid, or to produce a pulsed waveform as shown in FIGS. 7A and 7B, with the waveform having a predetermined wavelength and frequency.

When the wavelength of the carrier light is known in advance, the relative dimensions of the optical matrices 701A and 701B may be derived from the wavelength. As shown in FIG. 7A, the optical matrix 701A includes a substrate 702, which supports a plurality of features 704. The features 704 may have a height H3 that introduces a 180° phase delay into the reflected light signal. This phase delay may be in addition to a 180° phase delay caused by the thickness of the substrate 702, the combined thickness or height of the substrate 702 and a feature 704 may be referred to as height H4. In this example, the height H4 may be twice the height H3. In other embodiments, the height H4 may be more or less than twice the height H3. However, the height H3 may introduce a known phase delay, such as a 180° phase delay or a 90° phase delay, even when the phase delay introduced by the substrate 702 is more or less than 180°.

Phase differences introduced by optical elements may be capture, stored, and compared in a variety of ways. For example, each pixel in the optical sensor 706 may capture a first iFOV when the optical matrix 701A is in a first position and a second, phase-shifted iFOV when the optical matrix 701A is in a second position. Two or more of these phase-shifted signals may, in addition to being used to increase resolution of an output image, be compared against a reference signal to determine depth with within a scene. Additionally or alternatively, phase-shifted signals captured by different pixels may be compared against the reference signal to determine depth within the scene. For example, the signals produced by the pixels 708A and 708B of optical sensor 706 may be compared to determine a phase difference. Such phase differences may be used to identify the time it took for the signal 700 to be emitted (the time of emission may be known) and to be reflected back to the optical sensor 706. From this time, the distance from the pixels 708A and 708B to whatever object in the scene corresponds to the FOV of these pixels can be determined. Using such pixel-to-object distances, a three-dimensional depth map of the scene may be reconstructed.

FIG. 7B provides for additional phase delay differences to be introduced into the reflected light signal 700. FIG. 7B depicts an optical matrix 701B that may have a substrate 710 and a stepped feature 712. The feature 712 may include multiple steps, with each step introducing a different phase delay into the light signal 700. As shown, the stepped feature 712 may include portions that cause phase delays of 90°, 180°, 270°, and 360°. In some embodiments, the initial phase delay of 90° may be a different phase delay (i.e., more or less than 90°), but the phase differences from step to step may be predefined values, such as multiples of 90°. These known phase-delay differences may be used to optically recover phase information or to optically perform a portion of a demodulation operation on the reflected signal 700. The signals generated by the pixels 708A, 708B, 708C, and 708D may be utilized to recover the phase difference between the emitted light signal and the reflected light signal 700.

Conventional ToF depth sensors may have large pixels in part due to the circuitry required to perform circuit-based demodulation to recover the phase information accurately. The embodiments described herein may permit such demodulation to be performed, at least partially, in the optical domain, without the need for at least a portion of the traditional demodulation circuitry. In such embodiments, the overall pixel size of the optical sensor 312 may be decreased, which may enable fabrication of higher-resolution ToF sensors capable of creating higher-resolution depth maps than may be obtained with conventional ToF sensors. This may permit CMOS image sensors, the type of sensors used to capture conventional two-dimensional images such as a cellphone camera sensor, to be employed as ToF depth sensors with correspondingly smaller pixel sizes, such as approximately 2 microns by 2 microns or less in certain examples. In some embodiments, the phase difference between the emitted and reflected signals may be determined using a combination of optical demodulation and circuit-based demodulation.

Figure 8A:
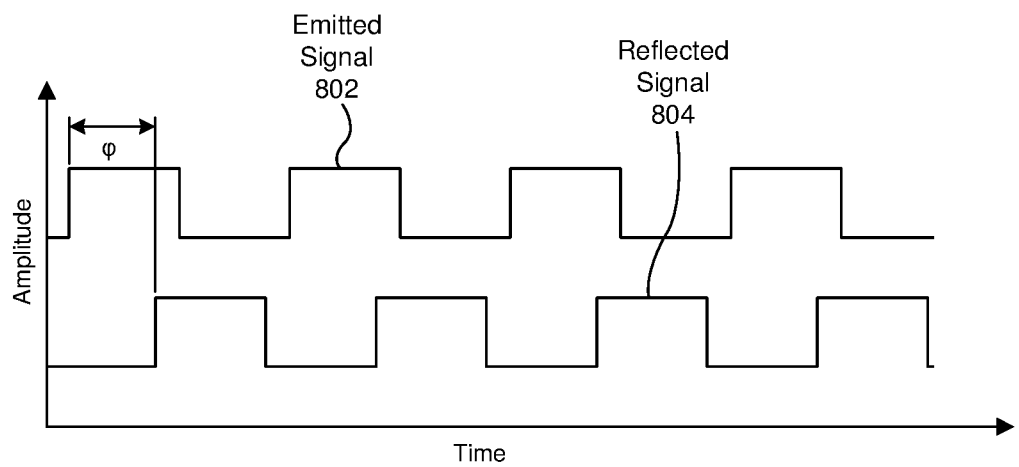
FIG. 8A shows a time-based comparison of an emitted signal and a reflected signal, according to some embodiments.

FIG. 8A shows a time-based comparison of an emitted signal and a received, reflected signal, according to some embodiments. Some ToF systems may determine depth based on a single return pulse, reflected off a feature of the scene being imaged. Other ToF systems may utilize more information about the signal, such as information characterizing the phase of the emitted and reflected signals or the phase difference between the emitted and reflected signals. As shown in FIG. 8A, an emitted signal 802 may be modulated with a square wave. However, other embodiments may include modulation by different waveforms. After interacting with a scene, such as the scene 508 of FIGS. 5A-5D, by reflecting light off some aspects of the scene, a reflected signal 804 may be received by the optical sensor of an imaging device. For example, the reflected signal 804 may be a signal received by the pixel 708A of the optical sensor 706 of FIG. 7B.

The emitted signal 802 and the reflected signal 804 may be separated by a phase shift or phase difference φ, as shown in FIG. 8A. The phase difference φ may be understood as a sum of a first delay component φ1 due to the depth from the emitter of the emitted signal 802 to a portion of the scene and a second delay component φ2 due to the optical properties, shape, dimensions, and materials of an optical component, such as the matrix 701B of FIG. 7B, through which the signal passes in order to be received by the pixel 708A. Because the second delay component φ2 may be known or deterministic, the first delay component or phase difference φ1, which can be used to determine the time-of-flight of the signal, may be determined by subtracting the known second delay component φ2 from the phase difference φ. The phase difference φ1 may then be used to determine the depth value d from the optical sensor to a portion of the scene according to the equation (1) as follows:

$$d = \frac{c}{4\pi f}(\varphi 1) \quad (1)$$

An image processor may perform the operations of equation (1) to determine a depth from the phase difference φ1. For example, the image processing engine 160 of the processing subsystem 110 of FIG. 1 may perform some or all of these operations.

Figure 8B:
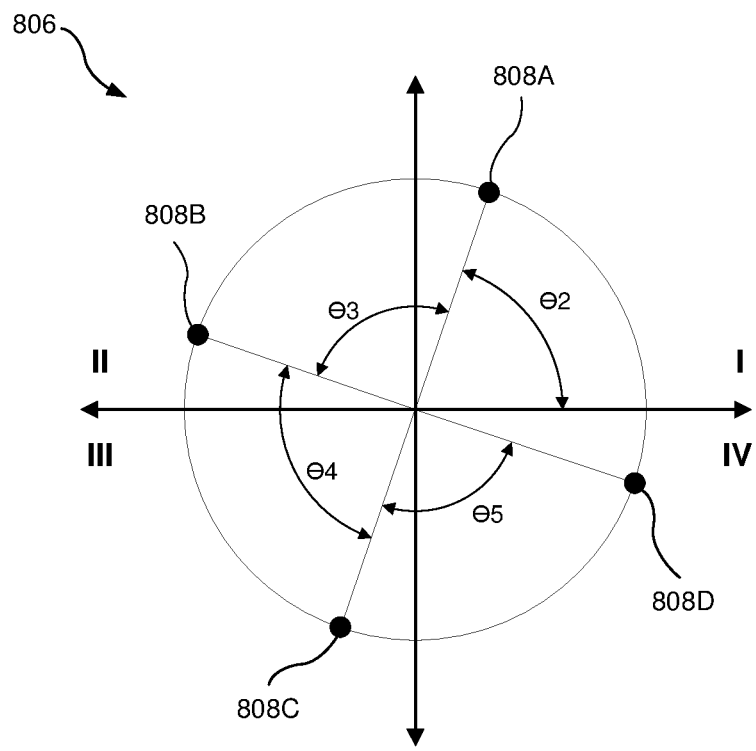
FIG. 8B shows a unit circle with an exemplary optical sampling scheme, according to some embodiments.

FIG. 8B shows a unit circle 806 with an exemplary optical sampling scheme, which may be implemented optically by embodiments of optical components described herein to at least partially demodulate the reflected signal 804 of FIG. 8A, such as by embodiments of any of the DOEs 400A-400D of FIGS. 4A-4D, which may be used to determine the phase difference φ1. The unit circle 806 shows the known or deterministic phase delays that may be introduced by an optical matrix, like the optical matrix 701B of FIG. 7A. The phase delay θ2 may be introduced by the substrate 710 and may be some value less than 90 degrees. The phase delay θ3 may be an additional 90 degrees, the phase delay θ4 may add an additional 90 degrees of phase delay to the reflected signal 804, and the phase delay θ5 may add yet another 90 degrees of phase delay. The phase differences or delays θ3, θ4, and θ5 may be predetermined multiples of 90 degrees or π/4.

In some embodiments, a calibration process may be performed before collecting data so that the delays may be determined precisely, and any undesired deviations from the intended dimensions of the optical matrix 701A may be compensated for by resulting calibration factors. The phase delays θ2, θ3, θ4, and θ5 may be selected and embodied in the substrate and protruding features and/or recessed features of an optical matrix or other optical component such that the phase of the reflected signal 804 may be sampled in all four quadrants (I, II, III, and IV) of the unit circle 806 shown by sample points 808A, 808B, 808C, and 808D. The signals may be generated by the accumulation of charges by pixels receiving the portions of light with the different known phase delays, for which the signals may be compensated. These signals generated by pixels 706A-D of FIG. 7B may then be utilized to identify the phase difference φ1 according to equation (2) as follows:

$$\varphi 1 = \arctan\left(\frac{\text{Pixel } 706D - \text{Pixel } 706C}{\text{Pixel } 706B - \text{Pixel } 706A}\right) \quad (2)$$

In this way, the phase difference φ1 may be determined based on optically delayed signals rather than electronically delayed signals as in some conventional phase-based ToF depth sensors.

Some embodiments may also leverage existing global-shutter and pixel-level-storage technologies to use two pixels to create four phase-shifted signals without sacrificing the additional resolution that is lost when using four different pixels to create the signals shown in FIG. 7B. For example, a system may include optical elements that create two phase-shifted optical paths that are captured by two different pixels (e.g., the pixels 708A and 708B) of the optical sensor 706 while the optical elements are in a first position. The information captured by the pixels may be stored locally within the optical sensor 706 or may be stored remotely for subsequent processing. The system may then shift one or more of the optical elements to a second position to create two additional phase-shifted optical paths, which may also be captured by the same pixels (e.g., pixel 708A and 708B) of the optical sensor 706. As a result, the optical sensor 706, or any other sensor described herein, may simultaneously provide four phase-shifted signals for demodulation processing (e.g., as shown in FIG. 8B). Furthermore, the two phase-shifted signals captured by each pixel may be processed to provide increased angular resolution of an output image, as discussed in greater detail in the description of FIGS. 5A-5D and 6A-6C.

In some embodiments, the optical matrices 701A and 701B, the DOEs 400A-400D, and some other optical components described herein may be produced using manufacturing techniques similar to those used in semiconductor device manufacturing and semiconductor mask fabrication. For example, the substrate 702 may be a portion of a wafer, such as a silicon wafer, a silicon-on-insulator (SOI) wafer, or another wafer of a material having a suitable refractive index that provides for a change of refraction and/or diffraction that can introduce a phase delay or alter the direction of propagation of a light signal in an interference pattern.

The substrate 702 may have a thickness between approximately 0.5 microns and approximately tens or hundreds of microns, in some examples. The features 704 and 712 may be formed by additive processes and/or subtractive processes. For example, the material of the features 704 may be deposited over the substrate 702 by physical vapor deposition (PVD), chemical vapor deposition (CVD), ion beam deposition, vapor-phase epitaxy, atomic layer deposition, etc. Some embodiments may include an etching process or another material removal process that removes substrate material from a material layer to formed the patterned features 704 and 712. Accordingly, the material of the substrate 702 may be different from the material of the features 704/712. In some implementations, the various steps of the feature 712 may be produced as a result of several patterning and growth processes and/or a result of patterning and etching process. In some embodiments, such as in embodiments using epitaxial growth, the features 704 may be grown on a patterned surface. For example, the features may be grown to the desired height H3 on portions of the substrate 702 exposed by windows formed in a photoresist layer.

The height H3 may introduce a desired phase delay (e.g., 45°, 90°, 180°, 270° of phase delay) based on the refractive index of the material of feature 704 and its dimensions. In some embodiments, the height H3 may be approximately 5 nm to approximately 50 nm to produce the desired phase delay. In other embodiments, the height H3 may be greater such that it introduces a greater phase delay that is equivalent to 360° plus the actual desired phase delay of 90°, 180°, 270°, etc. This greater height H3 and associated greater phase delay may provide a phase-equivalent delay to the desired delay of the lower height while improving manufacturability.

Figure 9A:
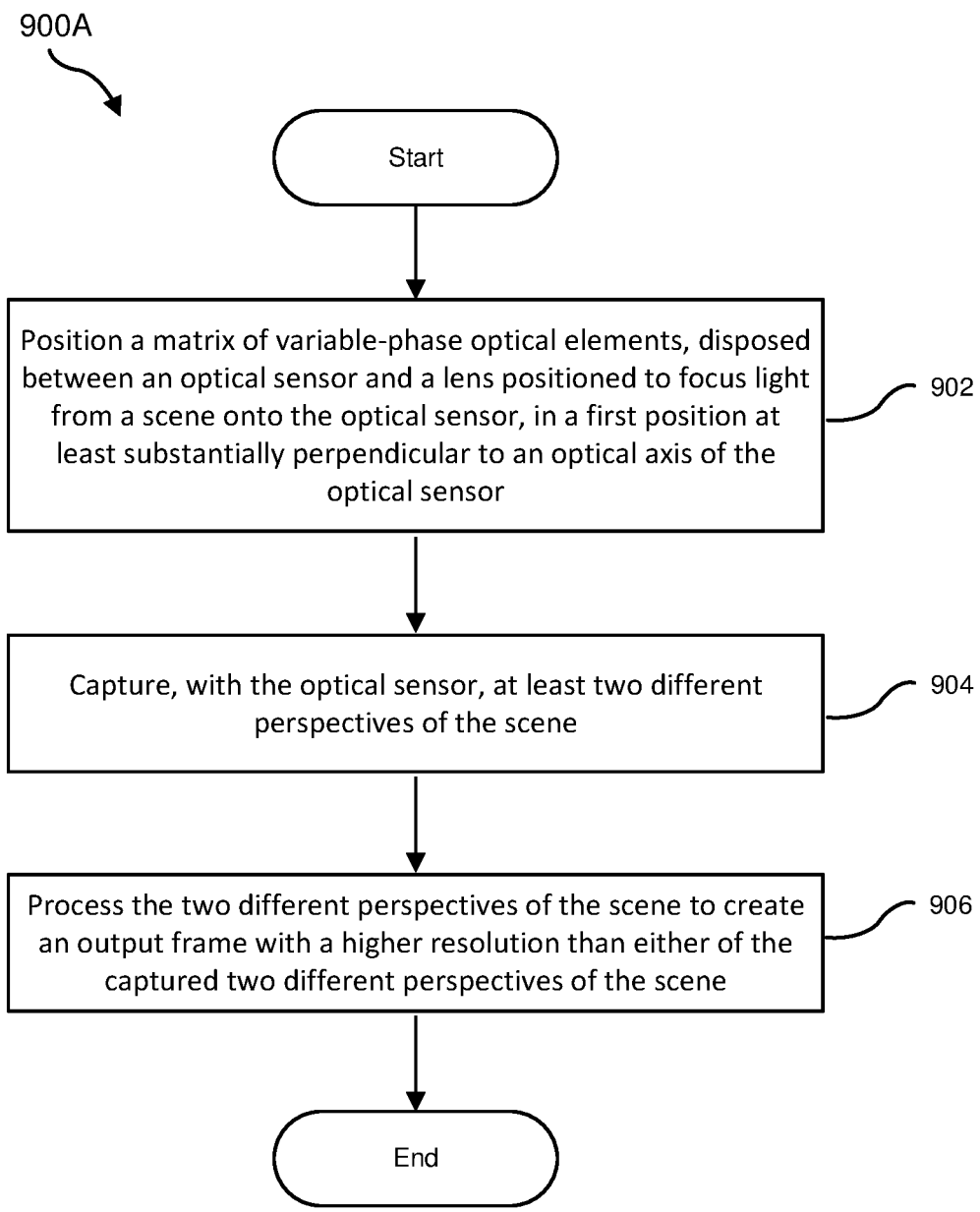
FIG. 9A is a flow chart of a method for using a matrix of variable-phase optical elements to generate a resolution-enhanced output image, according to some embodiments.

FIG. 9A is a flow chart of a method 900A for using a matrix of variable-phase optical elements to generate a resolution-enhanced output image or an output frame, which may be an image that forms a part of a series of images that make up a video, according to some embodiments. The steps shown in FIG. 9A may be performed by any suitable computer-executable code and/or computing system, including the system(s) illustrated in FIG. 1. In one example, each of the steps shown in FIG. 9A may represent an algorithm whose structure includes and/or is represented by multiple sub-steps, examples of which will be provided in greater detail below.

As illustrated in FIG. 9A, at step 902 one or more of the systems described herein may position an optical component, such as a matrix of variable-phase optical elements, disposed between an optical sensor and a lens positioned to focus light from a scene onto the optical sensor, in a first position at least substantially perpendicular (e.g. exactly perpendicular or only a few degrees or less away from exactly perpendicular as may occur according to manufacturing tolerances) to an optical axis of the optical sensor. For example, a processing device may trigger or activate position components 326A and 326B of FIG. 3A to position or reposition the optical matrix 320 relative to the optical sensor 312. The optical matrix 320 may be moved at least substantially parallel with the optical sensor 312 from a first position to at least a second position. By repositioning the optical matrix 320, the different perspectives of the scene may be captured, with the different perspectives corresponding to each different position. In some embodiments, the matrix of variable-phase optical elements may be positioned in a fixed manner.

At step 904, one or more of the systems described herein may capture, with the optical sensor, at least two different perspectives of the scene. For example, the optical sensor 502 of FIGS. 5B-D may capture an intermediate image at the perspective shown in FIG. 5B, in which the pixel 504 may receive light from the iFOV 514B. The optical matrix 510 may be repositioned as shown in FIG. 5C so that the pixel 504 may receive light from the iFOV 514C. The optical sensor 502 may then capture another intermediate image at the perspective shown in FIG. 5C. In some embodiments of the method 900A, the optical matrix 510 may be repositioned again as shown in FIG. 5D, and yet another perspective may be captured. The optical matrix 510 may be repeatedly positioned, and each time a new perspective may be captured.

At step 906, one or more of the systems described herein may process the two different perspectives of the scene to create an output frame or output image with a higher resolution than either of the captured two different perspectives of the scene. For example, the image processing circuitry of the optical sensor 212, 312, or 502, or an external processor, may combine the different perspectives to generate an enhanced representation of the scene 508 having samples as shown in FIG. 6C, which includes default position samples and altered position samples. In some embodiments, these samples may be combined into a single output image that includes more pixel values than the optical sensor has pixels. In some embodiments, the method 900A may include a step of interpolating pixel values between the actual pixel values obtained by sampling the scene at default and altered positions. In this additional way, the output image may have a higher resolution in x- and y-directions than the optical sensor has pixels in its array.

Additionally or alternatively, operations of the method 900A may include embodiments in which capturing the at least two perspectives of the scene may include capturing a first portion of light with a first pixel or set of pixels of an optical sensor. The "portion of light" may refer to the light from a scene, like the scene 508 of FIGS. 5A-D, that may be focused by the optical components of an imaging system on an individual pixel or set of pixels of the optical sensor of that imaging system. For example, the portion of light may be the iFOV associated with the first pixel. The first portion of light may have a first phase delay due to the part of the matrix of variable-phase optical elements that it passed through. The capturing of the at least two perspectives may further include capturing a second portion of light with a second pixel or set of pixels of the optical sensor. The second portion of light may have a second phase due to passing through a different part of the matrix of variable-phase optical elements.

Figure 9B:
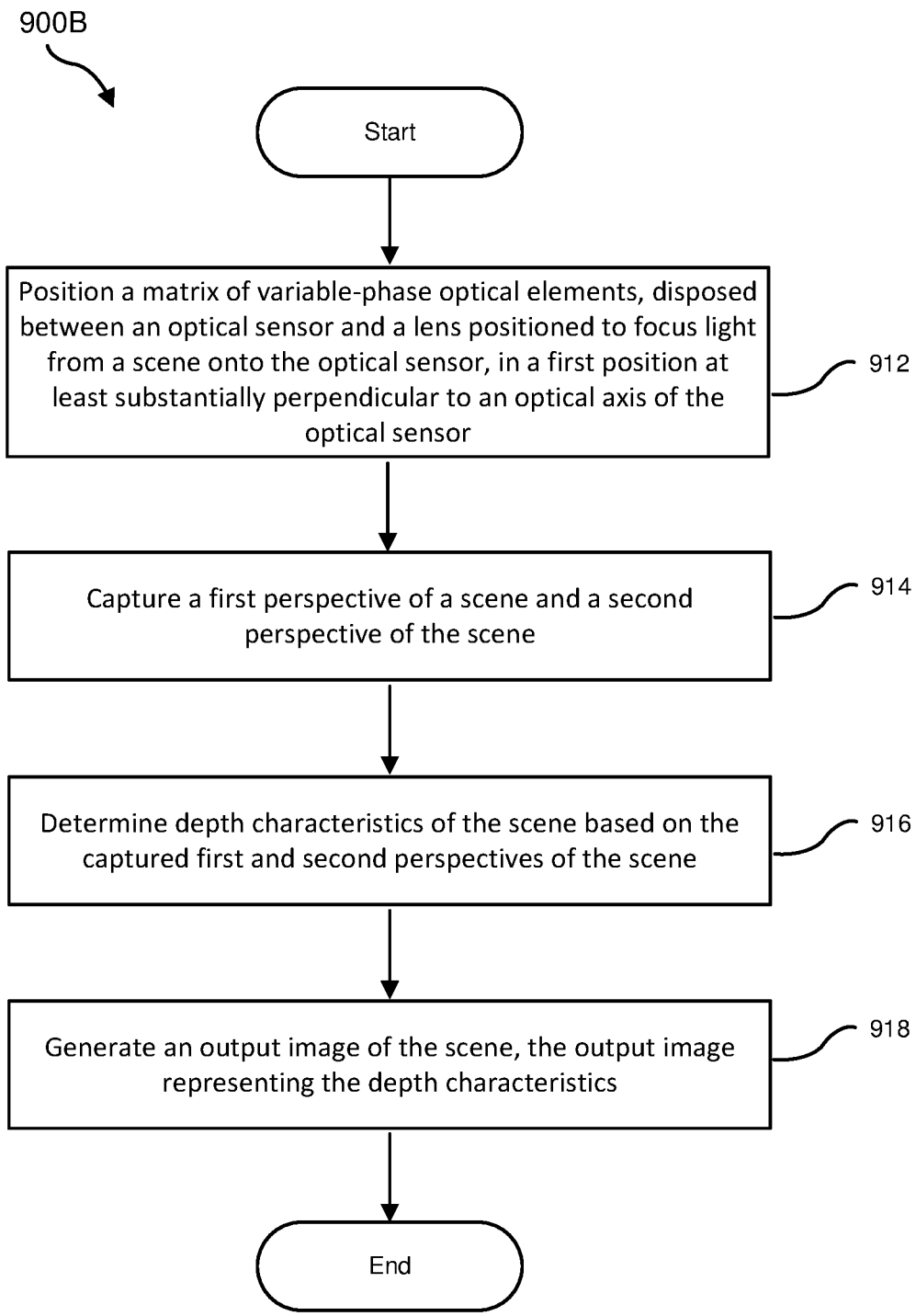
FIG. 9B is a flow chart of a method for using a matrix of variable-phase optical elements to generate an output image having depth characteristics of a scene, according to some embodiments.

FIG. 9B is a flow chart of a method 900B for using a matrix of variable-phase optical elements to generate an output image having depth characteristics of a scene, according to some embodiments. As with the method 900A of FIG. 9A, the steps shown in FIG. 9B may be performed by any suitable computer-executable code and/or computing system, including the system(s) illustrated in FIGS. 1, 2, 3A-D, 10, and 11, among others. In one example, each of the steps shown in FIG. 9B may represent an algorithm whose structure includes and/or is represented by multiple sub-steps, examples of which will be provided in greater detail below.

Embodiments of the method 900B may begin at step 912 in which any of the systems described herein may position a matrix of variable-phase optical elements, disposed between an optical sensor and a lens positioned to focus light from a scene onto the optical sensor, in a first position at least substantially perpendicular to an optical axis of the optical sensor. For example, the DOE 330 of FIG. 3B, or any other suitable optical component, may be disposed between the optical sensor 312 and the lens 316. The DOE 330 may be positioned in a fixed relationship to the optical sensor 312 in some embodiments. In other embodiments, the DOE 330 may be moveable in a plane substantially parallel to the optical sensor 312 and may be moved or repositioned by actuation of a positioning system 326, which may include at least one positioning component 326A. The DOE 330 may cause the iFOV of at least some of the pixels of the optical sensor 312 to shift so as to capture a different portion of the scene, as shown in FIGS. 5B-D.

At step 914, one or more of the disclosed systems may capture, with the optical sensor, at least two different perspectives of a scene. For example, the optical sensor 312 of FIG. 3B may capture at least two different perspectives of a scene. The different perspectives may correspond to different positions of the matrix of variable-phase optical elements. For example, embodiments of the method 900B may include capturing a first image when the matrix is in a first position associated with a first perspective and capturing a second image when the matrix is in a second position associated with a second perspective, to capture the different perspectives at step 914.

At step 916, one or more of the disclosed systems may determine depth characteristics of the scene based on the captured at least two perspectives of the scene. For example, the depth characteristics may be distances between a particular pixel or set of pixels and an object or feature of the scene being observed. In some embodiments, the depth characteristics may be obtained by performing a triangulation algorithm based on the at least two perspectives of the scene obtained at step 914. For example, the positioning system used to move the optical sensor between different positions corresponding to the at least two perspectives may be calibrated so that the absolute distance between the positions is known based on actuation signals used to control the positioning system. Because the distance between the two perspectives may be known, the difference in perspectives of various objects or features in the captured perspectives may be used to determine angles in each of the captured perspectives. For example, using the angle to a feature in a first captured perspective, the angle to the same feature in a second captured perspective, and the known distance between the two captured perspectives, an estimate of the distance from the centroid of the captured perspectives, which will be at some position on the optical sensor 312, may be determined using trigonometric relationships. The algorithm may be applied for a plurality of the pixels in an image to generate a depth map with depth values for many, most, or all of the pixels of the optical sensor 312. Any optical component of the imaging system may be moved in an oscillating or dithered manner to provide for many different measurements or captures, which may be combined or averaged in order to improve the accuracy of the triangulation. For example, an optical matrix may be dithered between two positions to obtain two baseline perspectives of a scene.

At step 918, one of more of the described systems may generate an output depth image of the scene. When rendered or similarly processed, the output depth image may provide a visual or mathematical representation of the depth characteristics of the scene. The scene may be representationally recreated by rendering the output depth image. In some embodiments, the depth image or depth map may have the same x- and y-direction resolution as the intermediate images captured to represent the at least two perspectives. The depth map further includes depth values, such as z-direction values extending along the optical axis of the optical sensor, like the optical axis 314 of FIGS. 3A-D.

Some embodiments of the method 900B may further include a step of emitting a light signal into the scene. Determining depth characteristics of the scene based on the captured at least two perspectives of the scene may include determining phase characteristics of the light signal. For example, the light signal 700 of FIGS. 7A and 7B may be emitted by the light projector device 250 at a known time and then reflected back some time later based on the distance to the reflection point. The matrix of variable-phase optical elements may direct a portion of light having a first phase delay to a first pixel and may direct a portion of light having a second phase delay to a second pixel.

In some embodiments of the method 900B, capturing the at least two different perspective may include capturing an image from each perspective, including at least a first image and a second image. The first image and the second image each include depth information, in some embodiments, while not including depth information in other embodiments.

Figure 9C:
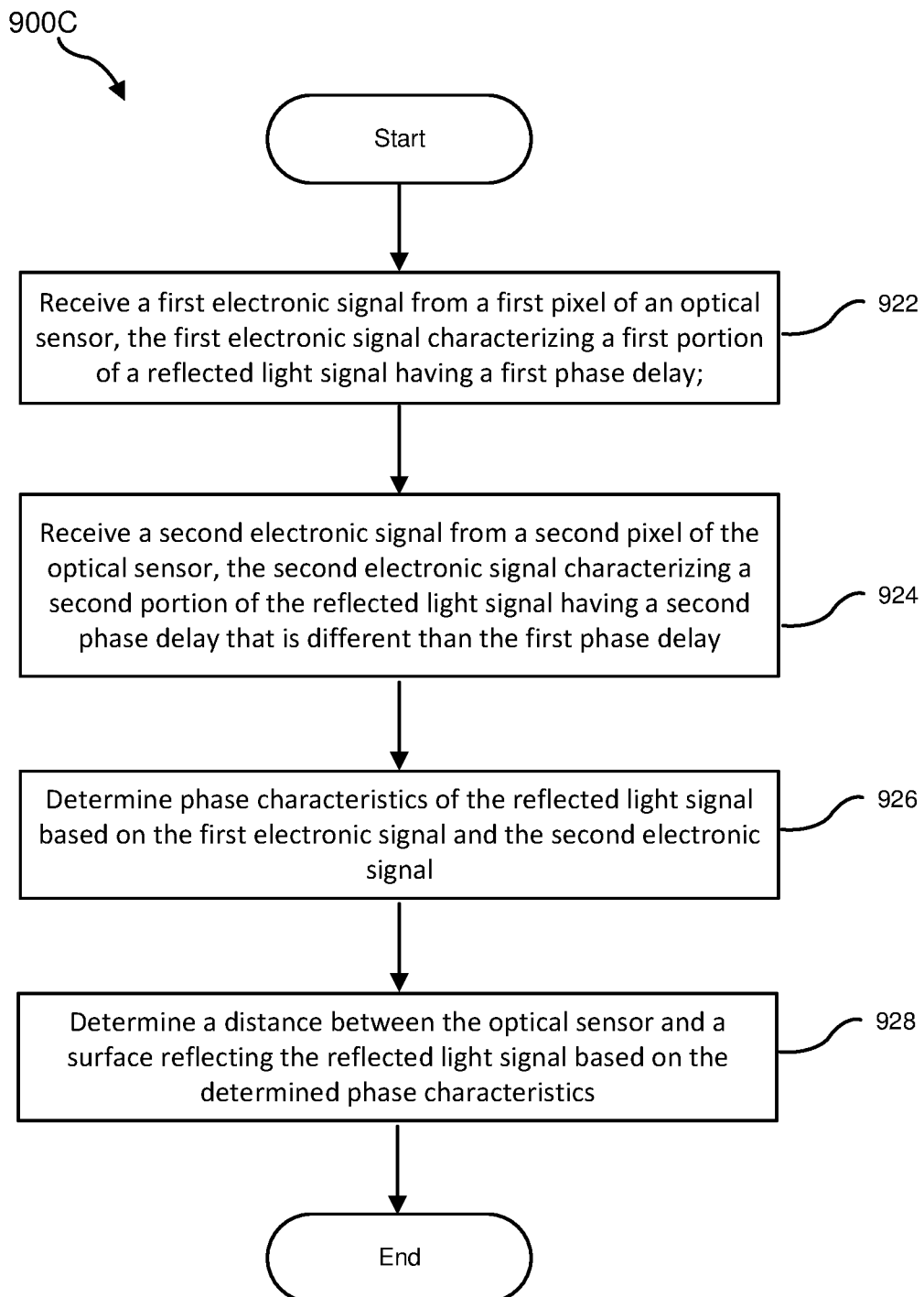
FIG. 9C is a flow chart of a method for using a matrix of variable-phase optical elements to generate phase-delayed incident light signals for use in an electrical phase discrimination operation, according to some embodiments.

FIG. 9C is a flow chart of a method 900C for using a matrix of variable-phase optical elements to demodulate a signal for a phase difference determination, according to some embodiments. As with the methods 900A of FIG. 9A and 900B of FIG. 9B, the steps shown in FIG. 9C may be performed by any suitable computer-executable code and/or computing system, including the system(s) illustrated in FIGS. 1, 2, 3A-D, 10, and 11, among others. In one example, each of the steps shown in FIG. 9C may represent an algorithm whose structure includes and/or is represented by multiple sub-steps, examples of which will be provided in greater detail below.

At a step 922, one or more systems described herein may receive a first electronic signal from a first pixel of an optical sensor. This first electronic signal may represent a first portion of a reflected light signal having a first phase delay. For example, the pixel 708A of the optical sensor 706 shown in FIGS. 7A and 7B receives a reflected light signal 700 through the substrate 702 of another optical component, such as a matrix of variable-phase optical elements or a DOE. Because of the material and thickness of the substrate 702, the reflected light signal 700 is modulated by a phase delay. The phase delay may be 90° or less in some embodiments. Other embodiments of the optical component may introduce a larger phase delay. The pixel 708A generates an electronic signal characterizing the received light signal having the first phase delay. The electronic signal may be communicated to a processing device or subsystem such as a processing device included on the optical sensor 706 or the processing subsystem 110 of FIG. 1.

At a step 924, one or more systems described herein may receive a second electronic signal from a second pixel of the optical sensor. The second electronic signal may represent a second portion of the reflected light signal having a second phase delay that is different than the first phase delay. For example, the pixel 708B of the optical sensor 706 shown in FIGS. 7A and 7B receives a different portion of the reflected light signal 700 through the substrate 702 and through a feature formed thereon, such as the feature 704 of FIG. 7A or a step of the feature 712 of FIG. 7B. Because of the material and thickness of the substrate 702 and the feature, the reflected light signal 700 received by the pixel 708B may be modulated by a different phase delay. The phase delay may be 90° or less in some embodiments. Other embodiments may introduce a larger phase delay. When the material and dimensions of the optical matrix and the wavelength of light included in the reflected signal 700 are known in advance or are predetermined, a phase difference between the first phase delay and the second phase delay may be predetermined. The pixel 708B may generate an electronic signal characterizing the received light signal having the second phase delay. The first and second phase delays may include a common delay component based on the distance travelled from emission to reception and different delay components caused by the portions of the optical matrix the light passes through. The electronic signal may be communicated to the processing device or processing subsystem.

At a step 926, one or more systems described herein may determine phase characteristics of the reflected light signal based on the first electronic signal and the second electronic signal. For example, the phase of the light signal 700 and the time-of-flight of the light signal may be recovered based on the known phase difference between the signals received at both the pixel 708A and the pixel 708B. In some embodiments of the method 900C, additional electronic signals may be received from additional pixels of the optical sensor. These additional signals may also include phase delays that are different than the first and second phase delays.

For example, embodiments of the method 900C may include steps of receiving a third electronic signal from a third pixel of the optical sensor and receiving a fourth electronic signal from a fourth pixel of the optical sensor. The third electronic signal may characterize a third portion of the reflected light signal having a third phase delay and the fourth electronic signal may characterize a fourth portion of the reflected light signal having a fourth phase delay. As shown in FIG. 7B, the first, second, third, and fourth phase delays introduced by the substrate 702 and the feature 712 may be different, such that the phase of the portion of the reflected light signal 700 received by each of the pixels 708A, 708B, 708C, and 708D is different, as in the sampling scheme shown in FIG. 8B. The signals may be received substantially simultaneously at the pixels 708A-D and may permit the reflected signal 700 to be optically demodulated, such that some of all of the circuitry of conventional ToF depth sensors dedicated to signal demodulation may be omitted from the optical sensors described herein, such as the optical sensor 706 of FIGS. 7A and 7B. Some embodiments, may include reduced circuitry for electronic demodulation, such that a hybrid approach to demodulation may be enabled by embodiments of the present disclosure. Such a hybrid approach may include a combination of optical demodulation and signal processing demodulation as described herein.

At a step 928, one or more systems described herein may determine a distance between the optical sensor and a surface reflecting the reflected light signal based on the determined phase characteristics. For example, the optical sensor 706 may include circuitry to determine a distance between individual pixels of the optical sensor 706 and features of the scene, based on the time-of-flight of the reflected signal 700. In determining the distance, a phase difference between the reflected signal and the previously emitted light signal that was reflected may be used. Embodiments of the method 900C may include activating emission of a light signal into a scene, so that the reflections from objects and features in the scene may be captured using the optical sensor 706. For example, the light source 252 of the projector device 250 of FIG. 2 may be activated to emit a modulated signal resulting in the reflected signal 700.

One or more of the steps of the methods 900A, 900B, and/or 900C, or other operations described herein may be performed by a processing subsystem. Such a processing subsystem may be a combination of discrete components, firmware, or software, and any of which can be located on a common circuit board, such as PCB 202, to which an optical sensor is attached, within another local component of an exemplary imaging device, or in a remote component, like the processing subsystem 110 of FIG. 1. Additionally or alternatively, the processing subsystem may be integrated into an optical sensor, like the optical sensors 212, 312, 502, in some embodiments.

Figure 10:
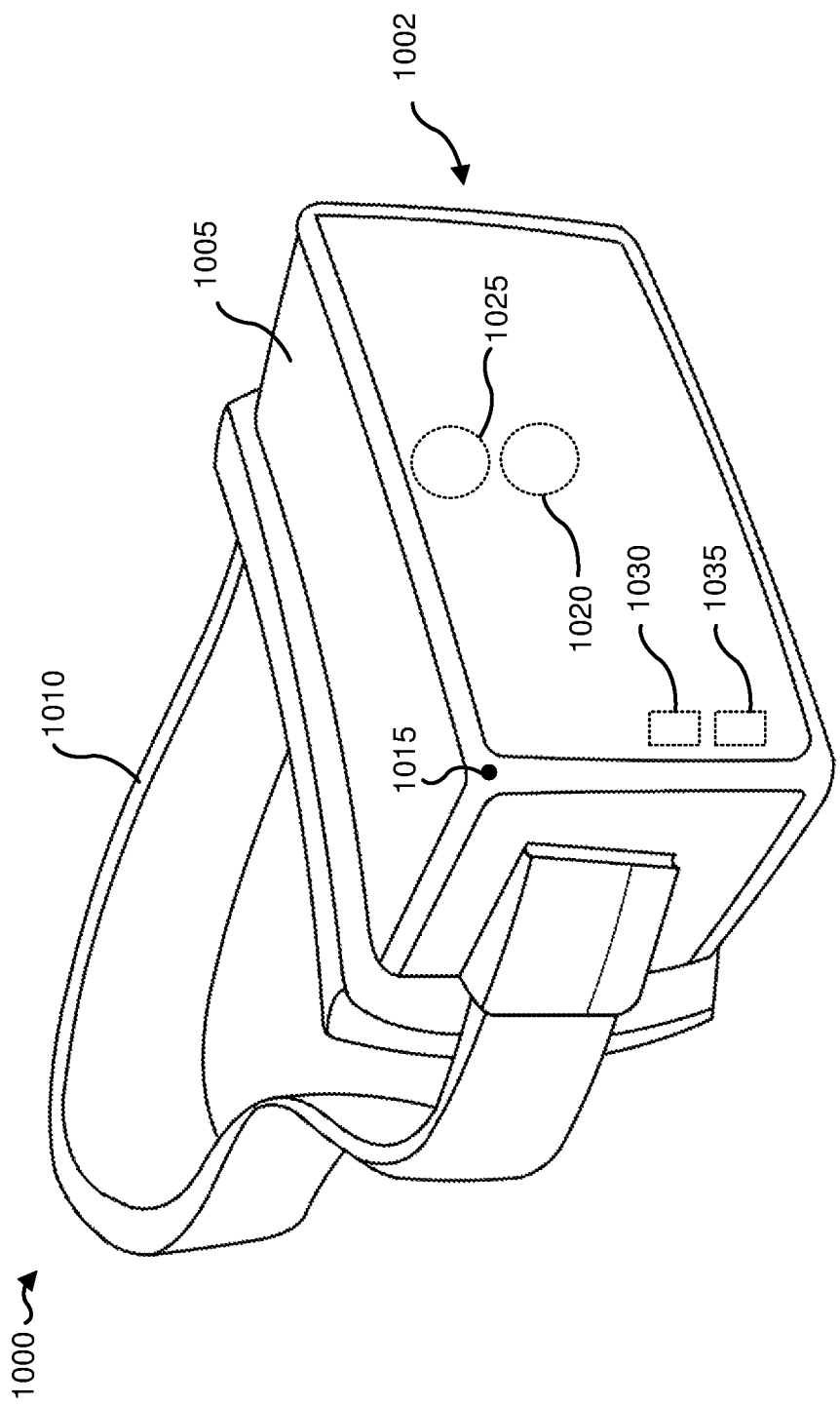
FIG. 10 is a perspective view of an HMD implementation of the imaging system of FIG. 1, according to some embodiments.

FIG. 10 is a diagram of an HMD 1000 that includes an imaging device, in accordance with embodiments of the present disclosure. The HMD 1000 may include the optical sensor device 105 of FIG. 1. The HMD 1000 may be part of a VR system, an AR system, an MR system, or some combination thereof. In embodiments that describe an AR system and/or an MR system, portions of a front side 1002 of the HMD 1000 may be at least partially transparent in the visible band (about 390 nm to about 750 nm), and portions of the HMD 1000 that are between the front side 1002 of the HMD 1000 and an eye of the user may be at least partially transparent (e.g., a partially transparent electronic display). The HMD 1000 may include a front rigid body 1005, a band 1010, and a reference point 1015. The HMD 1000 may also include an imaging system, like the imaging system 200 of FIG. 2, configured to determine depth information of a local area surrounding some or all of the HMD 1000. In addition, the HMD 1000 may include an imaging aperture 1020 and an illumination aperture 1025, and an illumination source of the imaging system may emit light (e.g., structured light) through the illumination aperture 1025, like the projector device 250 of FIG. 2. The imaging device may capture light from the illumination source that is reflected or backscattered from the local area through the imaging aperture 1020.

The front rigid body 1005 may include one or more electronic display elements, one or more integrated eye tracking systems, an IMU 1030, one or more position sensors 1035, and one or more reference points 1015. In the embodiment shown by FIG. 10, the position sensors 1035 are located within the IMU 1030, and neither the IMU 1030 nor the position sensors 1035 are visible to a user of the HMD 1000. The IMU 1030 may represent an electronic device that generates fast calibration data based on measurement signals received from one or more of the position sensors 1035. The position sensor 1035 may generate one or more measurement signals in response to motion of the HMD 1000. Examples of the position sensors 1035 include: one or more accelerometers, one or more gyroscopes, one or more magnetometers, another suitable type of sensor that detects motion, a type of sensor used for error correction of the IMU 1030, or some combination thereof. The position sensors 1035 may be located external to the IMU 1030, internal to the IMU 1030, or some combination thereof. The one or more reference points 1015 may be utilized for tracking a position of the HMD 1000 in a local area by, for example, the tracking module 155 of FIG. 1.

Figure 11:
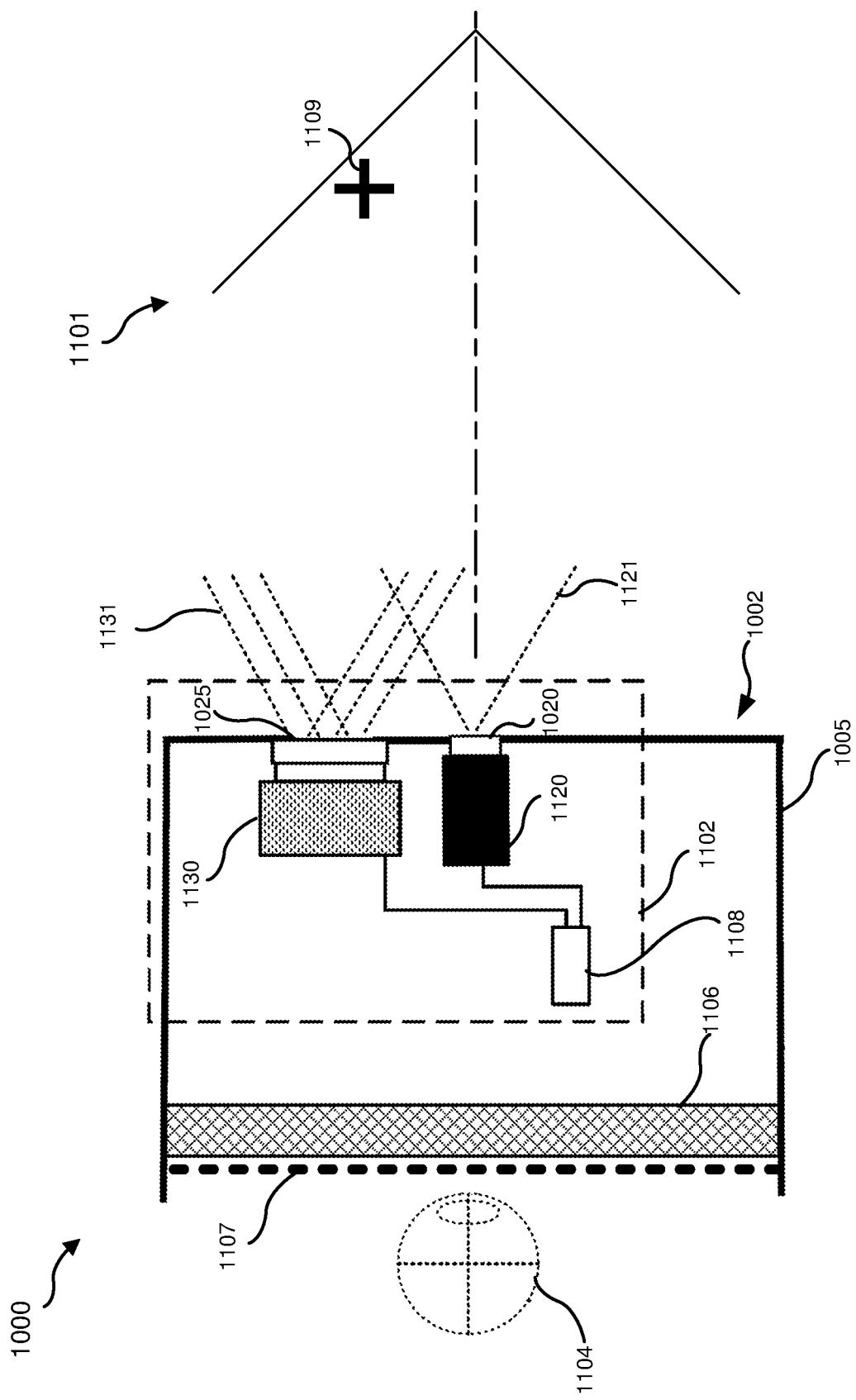
FIG. 11 is a cross-sectional diagram of a front rigid body of the HMD of FIG. 10, according to some embodiments.

FIG. 11 represents a cross section of the front rigid body 1005 of the HMD 1000 of FIG. 10. As shown in FIG. 11, the HMD 1000 may include an imaging system 1102. In some examples, the imaging system 1102 (which may be an embodiment of the imaging device 120 of FIG. 1) may be configured to capture image data that is utilized in determining, mapping, and/or tracking position, orientation, and/or movement of objects within an area, such as local environment or scene 1101 (e.g., an area in front of the imaging system 1102). In some examples, the imaging system 1102 may include the imaging aperture 1120 configured to receive light produced in or reflected or backscattered from the local area or scene 1101, through the aperture 1020, and a projector device 1130 configured to emit light (i.e., a carrier signal) into the scene 1101, which may include an object 1109. The light may include a specific wavelength range, such as the visible wavelength spectrum or an infrared spectrum, etc.

In some embodiments, the imaging system 1102 may determine depth and/or surface information for objects within the scene 1101 in a variety of ways. For example, the imaging system 1102 may be utilized in a SLAM tracking system to identify and/or map features of the scene 1101 and/or to identify a location, orientation, and/or movement of the HMD 1000 and/or other objects (e.g., hand-held controllers, users, etc.) in the scene 1101. In some examples, the projector device 1130 may emit light 1131 as a structured light pattern (e.g., a symmetric and/or quasi-random dot pattern, a grid pattern, horizontal bars, etc.) into the scene 1101. The emitted light 1131 may have a wavelength range of 400 nm to about 1100 nm. In some embodiments, the emitted light 1131 may have a narrower wavelength range, such as 800 nm to about 980 nm.

In these examples, the imaging system 1102 may determine the depth and/or surface information based on triangulation or perceived deformation of the emitted pattern. Additionally or alternatively, the imaging system 1102 may capture ToF information describing the time required for light emitted from the illumination source of the projector device 1130 to be reflected from one or more objects in the scene 1101 back to the imaging device 1120, which collects reflected light 1121. In this embodiment, the imaging system 1102 may determine a distance between the imaging system 1102 and the objects in the scene 1101 based on the ToF information.

In some examples, information collected by the imaging system 1102 may be used as part of an image and/or video (e.g., an artificial reality image and/or video) displayed to a user wearing the HMD 1000. In one example, shown in FIG. 11, the image and/or video may be displayed to a user (e.g., via an eye 1104 of the user) via the electronic display 1106. The electronic display 1106, which may be an embodiment of the electronic display 125 of FIG. 1, may represent a single electronic display or multiple electronic displays (e.g., a display for each eye of a user). Examples of the electronic display 1106 may include, without limitation, an LCD display, an OLED display, an ILED display, an AMO-LED display, a TOLED display, a projector, a cathode ray tube, an optical mixer, and/or some combination thereof. The imaging system 1102 may also include an imaging controller 1108, which may be an image processor that is coupled to the projector device 1130 and/or the imaging device 1120. An optics block 1107 may be included in some embodiments to improve the performance of the electronic display 1106 with respect to the user of the HMD 1000.

Accordingly, embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including an HMD connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A depth imaging device comprising:
an optical sensor having an optical axis;
a lens positioned to focus light from a scene onto the optical sensor;
a matrix of variable-phase optical elements that are dimensioned to introduce at least two different phase delays into a wavefront of the light from the scene;
a housing that secures the matrix of variable-phase optical elements between the optical sensor and the lens;
a communication bus coupled to a processing system that directs the optical sensor to capture at least two different perspectives of the scene to create an output image indicating depth within the scene; and
a positioning system that:
couples an optical component of the depth imaging device to the housing, the optical component comprising at least one of the lens, the optical sensor, or the matrix of variable-phase optical elements, and
moves the optical component into multiple different positions to capture the at least two different perspectives of the scene.

2. The depth imaging device of claim 1, wherein the positioning system comprises at least one of:
a channel configured to receive an edge of the optical component;
an adhesive securing the optical component in a fixed position relative to the housing; or
an active positioning component operable to moveably position the optical component at least substantially perpendicular to the optical axis.

3. The depth imaging device of claim 2, wherein the processing system is configured to capture the at least two different perspectives by:
capturing a first image when the optical component is in a first position associated with a first perspective;
actuating the active positioning component to move the optical component from the first position to a second position;
capturing a second image when the optical component is in the second position associated with a second perspective; and
combining the first image and the second image into the output image having depth information characterizing at least a portion of the scene.

4. The depth imaging device of claim 3, wherein:
the processing system is further programmed to combine the first image and the second image into the output image by triangulation between the two different perspectives of the scene represented by the first image and the second image to provide a depth map of the scene as the output image; and
the depth map comprises depth dimension values for a plurality of portions of the scene.

5. The depth imaging device of claim 3, wherein:
the first and second images comprise depth images of the scene, each image comprising a three-dimensional representation of the scene; and
the output image comprises depth information from the first image and the second image.

6. The depth imaging device of claim 1, wherein the processing system is programmed to:
capture a first image when the optical component is in a first position associated with a first perspective;
actuate an active positioning component to move the optical component from the first position to a second position;
capture a second image when the optical component is in the second position associated with a second perspective;
generate interpolated pixel data corresponding to image data between the first position and the second position; and
combine the first image, the second image, and the interpolated pixel data into the output image, the output image having a greater resolution than either the first image or the second image.

7. The depth imaging device of claim 6, wherein the matrix of variable-phase optical elements decreases an instantaneous field-of-view (iFOV) of each pixel included in the optical sensor.

8. The depth imaging device of claim 1, further comprising:
a light source configured to illuminate the scene with light in an infrared wavelength range configured for use in depth sensing; and
wherein the matrix of variable-phase optical elements comprises a diffractive optical element (DOE) having features that are dimensioned to introduce at least two different phase delays into a wavefront of the light in the infrared wavelength range received as reflected from the scene through the lens to at least partially optically demodulate the light.

9. The depth imaging device of claim 1, further comprising an array of microlenses disposed on a top surface of the matrix to focus light through the matrix.

10. The depth imaging device of claim 9, wherein each microlens of the array of microlenses is positioned consistently with respect to a pattern present in the matrix of variable-phase optical elements.

11. A depth imaging device comprising:
an optical sensor having an optical axis;
a lens positioned to focus light from a scene onto the optical sensor;
a matrix of variable-phase optical elements that are dimensioned to introduce at least two different phase delays into a wavefront of the light from the scene;
a housing that secures the matrix of variable-phase optical elements between the optical sensor and the lens;
a positioning system that couples an optical component of the depth imaging device to the housing, the optical component comprising at least one of the lens, the optical sensor, or the matrix of variable-phase optical elements; and
a communication bus coupled to a processing system configured to direct the optical sensor to capture at least two different perspectives of the scene to create an output image indicating depth within the scene, the creating comprising:
capturing a first image when the optical component is in a first position associated with a first perspective;
actuating an active positioning component to move the optical component from the first position to a second position;
capturing a second image when the optical component is in the second position associated with a second perspective; and
combining the first image and the second image into the output image having depth information characterizing at least a portion of the scene.

12. The depth imaging device of claim 11, wherein the positioning system comprises at least one of:
a channel configured to receive an edge of the optical component;
an adhesive securing the optical component in a fixed position relative to the housing; or
an active positioning component operable to moveably position the optical component at least substantially perpendicular to the optical axis.

13. The depth imaging device of claim 11, wherein:
the processing system is further programmed to combine the first image and the second image into the output image by triangulation between the two different perspectives of the scene represented by the first image and the second image to provide a depth map of the scene as the output image; and
the depth map comprises depth dimension values for a plurality of portions of the scene.

14. The depth imaging device of claim 11, wherein:
the first and second images comprise depth images of the scene, each image comprising a three-dimensional representation of the scene; and
the output image comprises depth information from the first image and the second image.

15. The depth imaging device of claim 11, wherein the processing system is further programmed to:
generate interpolated pixel data corresponding to image data between the first position and the second position; and
combine the first image, the second image, and the interpolated pixel data into the output image, the output image having a greater resolution than either the first image or the second image.

16. The depth imaging device of claim 15, wherein the matrix of variable-phase optical elements decreases an instantaneous field-of-view (iFOV) of each pixel included in the optical sensor.

17. The depth imaging device of claim 11, further comprising:
a light source configured to illuminate the scene with light in an infrared wavelength range configured for use in depth sensing; and
wherein the matrix of variable-phase optical elements comprises a diffractive optical element (DOE) having features that are dimensioned to introduce at least two different phase delays into a wavefront of the light in the infrared wavelength range received as reflected from the scene through the lens to at least partially optically demodulate the light.

18. The depth imaging device of claim 11, further comprising an array of microlenses disposed on a top surface of the matrix to focus light through the matrix.

19. The depth imaging device of claim 18, wherein each microlens of the array of microlenses is positioned consistently with respect to a pattern present in the matrix of variable-phase optical elements.

20. A method comprising:
- focusing, by a lens, light from a scene onto an optical sensor;
- altering, by a matrix of variable-phase optical elements positioned between the lens and the optical sensor, the light from the scene by introducing at least two different phase delays into a wavefront of the light from the scene;
- directing, by a processing system, the optical sensor to capture at least two different perspectives of the scene;
- moving, by a positioning system, an optical component into multiple different positions such that the optical sensor captures the at least two different perspectives of the scene, the optical component comprising at least one of the lens, the optical sensor, or the matrix of variable-phase optical elements;
- capturing, by the optical sensor, the at least two different perspectives of the scene; and
- creating, by the processing system, an output image indicating depth within the scene based on the captured at least two different perspectives of the scene.

* * * * *